(12) United States Patent
Glasgow et al.

(10) Patent No.: US 9,912,020 B2
(45) Date of Patent: Mar. 6, 2018

(54) BATTERY PACK WITH HEAT SINK

(71) Applicant: Milwaukee Electric Tool Corporation, Brookfield, WI (US)

(72) Inventors: Kevin L. Glasgow, Lomira, WI (US); Brandon L. Verbrugge, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 726 days.

(21) Appl. No.: 14/207,486

(22) Filed: Mar. 12, 2014

(65) Prior Publication Data

US 2014/0272517 A1    Sep. 18, 2014

Related U.S. Application Data

(60) Provisional application No. 61/777,188, filed on Mar. 12, 2013.

(51) Int. Cl.

| | |
|---|---|
| *H01M 10/6554* | (2014.01) |
| *H01M 2/10* | (2006.01) |
| *H01M 10/6551* | (2014.01) |
| *H01M 10/6555* | (2014.01) |
| *H01M 10/643* | (2014.01) |
| *H01M 10/6235* | (2014.01) |
| *H01M 10/613* | (2014.01) |

(52) U.S. Cl.
CPC ....... *H01M 10/5053* (2013.01); *H01M 2/105* (2013.01); *H01M 10/613* (2015.04); *H01M 10/6235* (2015.04); *H01M 10/643* (2015.04); *H01M 10/6551* (2015.04); *H01M 10/6554* (2015.04); *H01M 10/6555* (2015.04); *H01M 2220/30* (2013.01)

(58) Field of Classification Search
CPC ......... H01M 10/5053; H01M 10/6551; H01M 10/6555; H01M 10/643; H01M 10/6235; H01M 10/613; H01M 10/6554; H01M 2/105; H01M 2220/30
See application file for complete search history.

(56) References Cited

U.S. PATENT DOCUMENTS

| | | | |
|---|---|---|---|
| 3,537,907 | A | 11/1970 | Wilson |
| 4,314,008 | A | 2/1982 | Blake |
| 4,517,263 | A | 5/1985 | Reiss et al. |
| 4,536,694 | A | 8/1985 | McCarty et al. |
| 4,937,705 | A | 6/1990 | Piber |
| 5,035,964 | A | 7/1991 | Levinson et al. |
| 5,200,657 | A | 4/1993 | Prestel |
| 5,229,702 | A | 7/1993 | Boehling et al. |

(Continued)

FOREIGN PATENT DOCUMENTS

EP    0076039    4/1983

*Primary Examiner* — Lisa S Park
(74) *Attorney, Agent, or Firm* — Michael Best & Friedrich LLP

(57) ABSTRACT

A battery pack including a housing including an inner cavity and an interface for receiving a power tool. The interface includes electrical terminals operable to interface with the power tool. Battery cells are positioned within the cavity and are electrically coupled to the electrical terminals. The battery pack also includes at least a portion of the housing that is configured as a heat sink to passively dissipate heat generated in the cavity to an external environment of the battery pack.

19 Claims, 18 Drawing Sheets

(56) References Cited

U.S. PATENT DOCUMENTS

| | | | |
|---|---|---|---|
| 5,289,047 A | | 2/1994 | Broghammer |
| 5,456,994 A | | 10/1995 | Mita |
| 5,567,542 A | | 10/1996 | Bae |
| 5,585,204 A | | 12/1996 | Oshida et al. |
| 5,637,036 A | | 6/1997 | Hepworth |
| 5,871,859 A | | 2/1999 | Parise |
| 5,874,825 A | | 2/1999 | Brotto |
| 6,537,694 B1 | | 3/2003 | Sugiura et al. |
| 6,551,123 B1 | | 4/2003 | Schaeffeler et al. |
| 6,692,864 B1 | * | 2/2004 | Dansui ................ H01M 2/1055 429/100 |
| 6,828,755 B1 | * | 12/2004 | Iverson ................ H01M 16/00 320/104 |
| 7,326,490 B2 | | 2/2008 | Moores, Jr. et al. |
| 2002/0034682 A1 | * | 3/2002 | Moores, Jr. ............ B25F 5/008 429/120 |
| 2003/0013009 A1 | * | 1/2003 | Dansui ................ H01M 2/105 429/120 |
| 2004/0257038 A1 | * | 12/2004 | Johnson ............. H01M 2/1055 320/116 |
| 2006/0096797 A1 | * | 5/2006 | Tsuchiya ............. B60R 16/04 180/68.5 |
| 2008/0259569 A1 | * | 10/2008 | Lin ........................ G06F 1/203 361/704 |
| 2011/0151297 A1 | * | 6/2011 | Shimizu ................ H01M 2/023 429/94 |
| 2011/0269002 A1 | * | 11/2011 | Kanata ................ H01M 2/0242 429/94 |
| 2012/0045671 A1 | | 2/2012 | Miller et al. |

\* cited by examiner

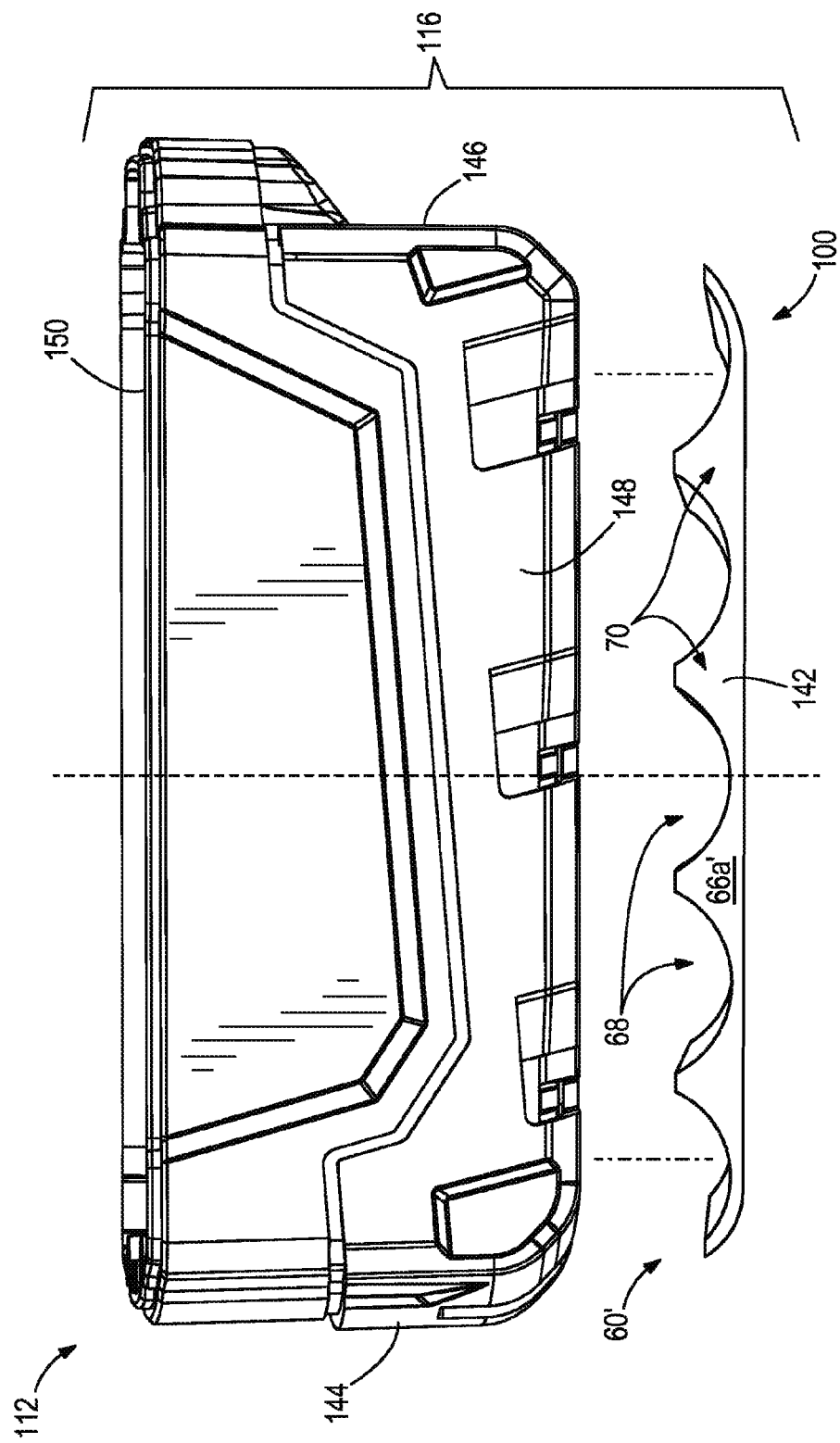

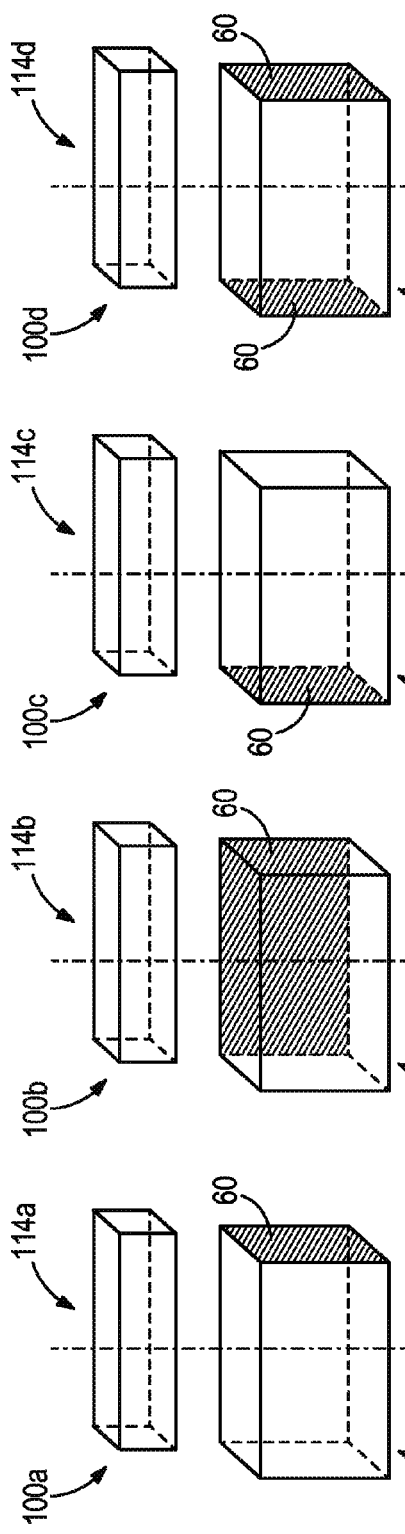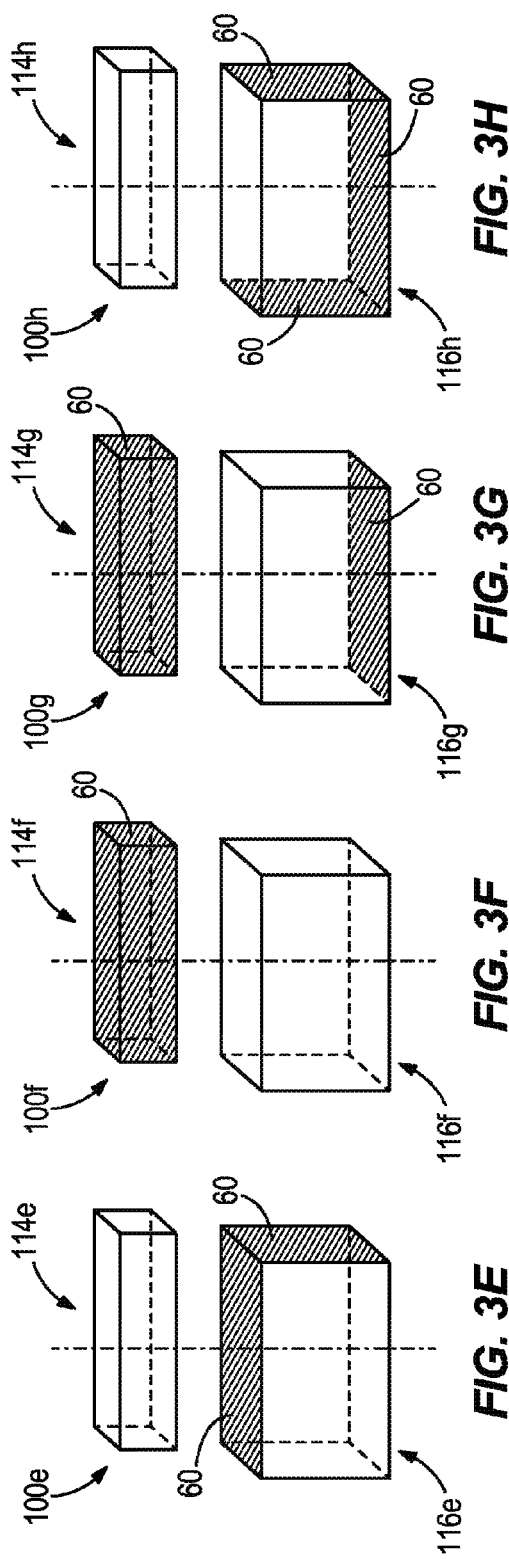

BATTERY PACK WITH HEAT SINK

CROSS REFERENCE TO RELATED APPLICATIONS

This application claims priority to U.S. Provisional Application No. 61/777,188, filed Mar. 12, 2013, the entire contents of which are incorporated herein by reference.

FIELD OF THE INVENTION

The present invention relates to a battery pack. In particular, the invention relates to a battery pack including heat management methods.

BACKGROUND

The housing of a battery pack includes a plurality of battery cells that generate heat while in use. Generally, as the duration of time that the battery pack is in use increases, and the rate at which the battery cells charge and discharge increase, the heat that is given off by the battery cells increases. As the temperature inside the battery pack rises, internal components of the battery pack may become susceptible to damage thereby causing battery malfunction.

SUMMARY

In one embodiment, the invention provides a battery pack including a housing including an inner cavity and an interface for receiving a power tool. The interface includes electrical terminals that are operable to interface with the power tool. Battery cells are positioned within the cavity and are electrically coupled to the electrical terminals. A heat sink forms at least a portion of one of the plurality of walls of the housing to at least partially define the inner cavity and includes a first surface exposed to the inner cavity and second surface exposed to an external environment of the battery pack.

In another embodiment, the invention provides a battery pack including a housing that has an interface for receiving a power tool, a base portion of the housing, and a plurality of walls coupling the interface to the base portion. The interface, base portion, and the plurality of walls define an inner cavity in which battery cells are positioned. The interface includes electrical terminals that are operable to interface with the power tool. Battery cells are positioned within the cavity and are electrically coupled to the electrical terminals. The battery pack further includes a heat sink that forms at least a portion of the housing and includes a first surface that is opposite a second surface. The first surface is in thermal communication with the battery cells, and a second surface includes a plurality of heat transfer elements exposed to an external environment of the battery pack.

In another embodiment the invention provides a housing including an inner cavity and an interface for receiving a power tool. The interface includes electrical terminals that are operable to interface with the power tool. Battery cells are positioned within the cavity and are electrically coupled to the electrical terminals. The battery pack also includes a metal heat sink fixed in one of the plurality of walls. The metal heat sink is configured to passively dissipate heat generated in the inner cavity to an external environment of the battery pack Other aspects of the invention will become apparent by consideration of the detailed description and accompanying drawings.

BRIEF DESCRIPTION OF THE DRAWINGS

FIG. 3 is an exploded view of a battery pack housing according to another embodiment of the invention including a second portion having a bottom wall constructed as a heat sink.

FIGS. 3A-H, 3J-3K, and 3M are schematic views of battery packs according to other embodiments of the invention, each embodiment including a battery pack housing having one or more walls or portions of walls that are constructed as a heat sink.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one embodiment, the invention provides a battery pack including a housing having a plurality of walls. The plurality of walls define a cavity therein for encasing a plurality of battery cells. At least a portion of at least one wall is configured as a metal heat sink. By configuring one or more walls, or portions thereof, as a metal heat sink, the heat transfer out of the battery pack is improved, preventing battery malfunction.

In another embodiment, the invention provides a battery pack including a housing having a plurality of walls. The plurality of walls define a cavity therein for a encasing a plurality of battery cells. At least a portion of at least one wall is configured as a metal heat sink, and includes an outer surface having a plurality of projections and channels formed of metal.

In another embodiment the invention provides a battery pack including a housing having a plurality of walls. The plurality of walls define a cavity therein for a encasing a plurality of battery cells. At least a portion of at least one wall is configured as a metal heat sink, and includes an outer surface having a plurality of projections and channels formed of metal. The battery pack also includes an overmold covering a portion of the housing and an aperture exposing the plurality of projections and channels formed of metal.

In another embodiment, the invention provides a battery pack including a housing having a plurality of walls. The plurality of walls define a cavity therein for encasing a plurality of battery cells. At least a portion of at least one wall is configured as a metal heat sink. The battery pack also includes a thermally conductive and electrically isolating layer positioned between the metal heat sink and the plurality of battery cells.

Figure 1A:
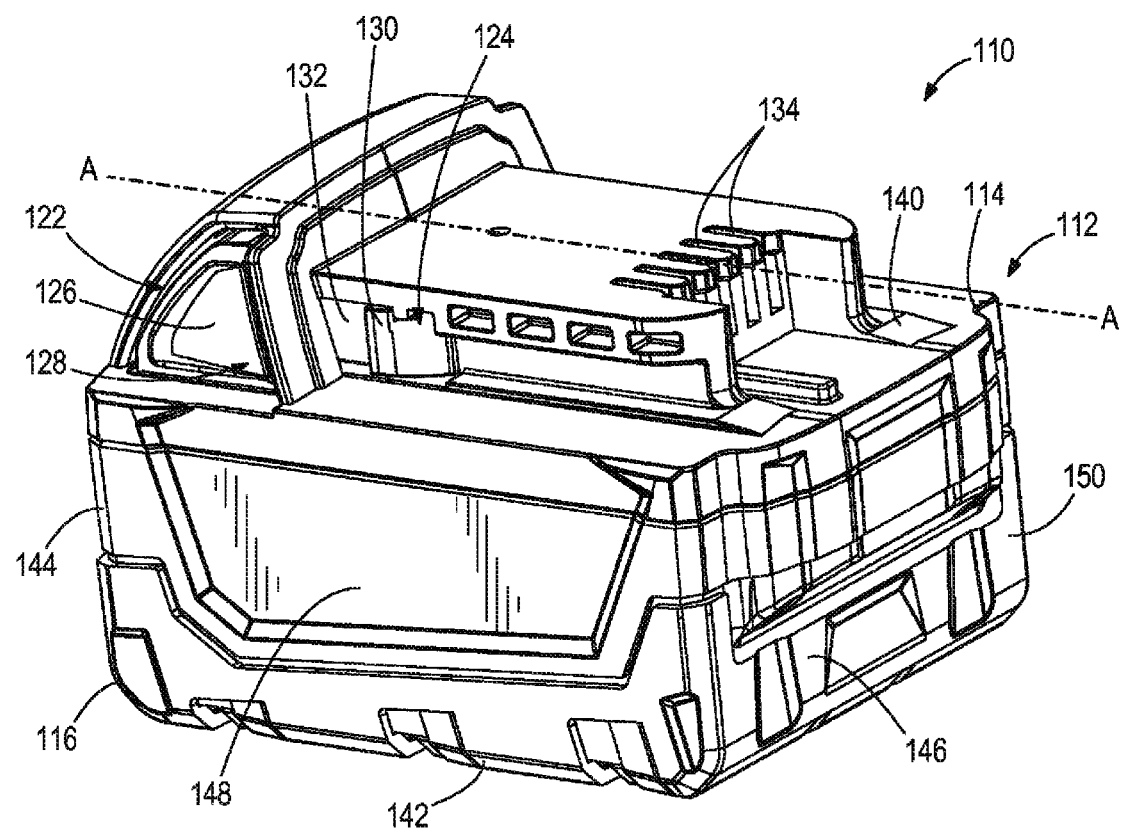
FIG. 1A is a perspective view of a battery pack for a power tool that includes a housing having a first portion and a second portion.
Figure 1B:
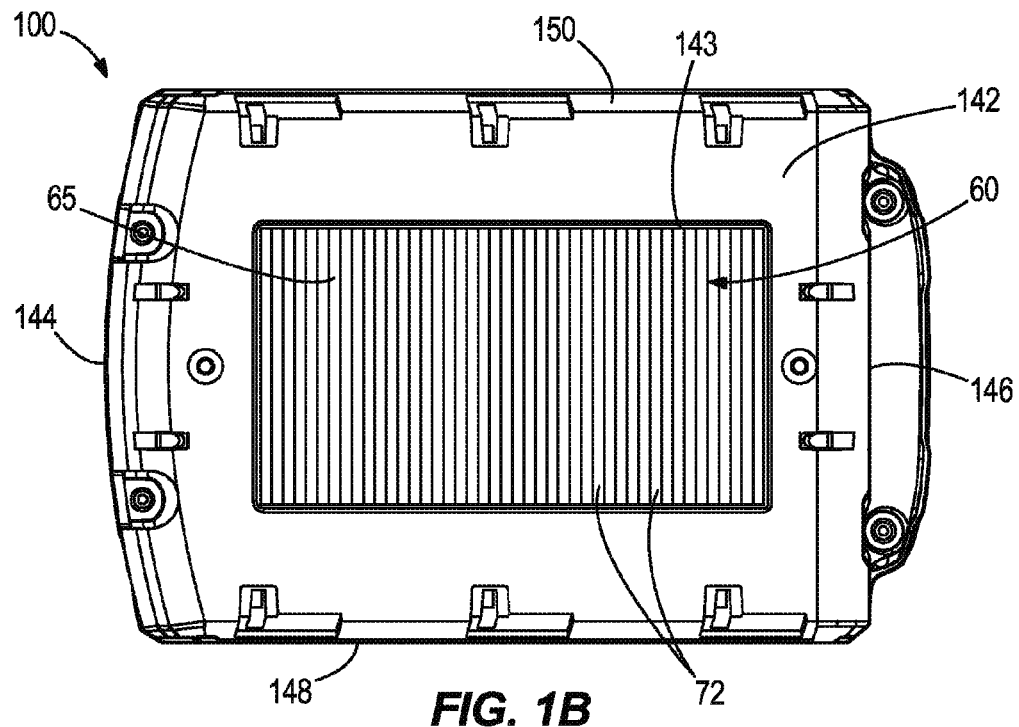
FIGS. 1B and 1C are schematic views of the battery pack of FIG. 1A in which the housing has one or more walls or portions of walls that are constructed as a heat sink.
Figure 1C:
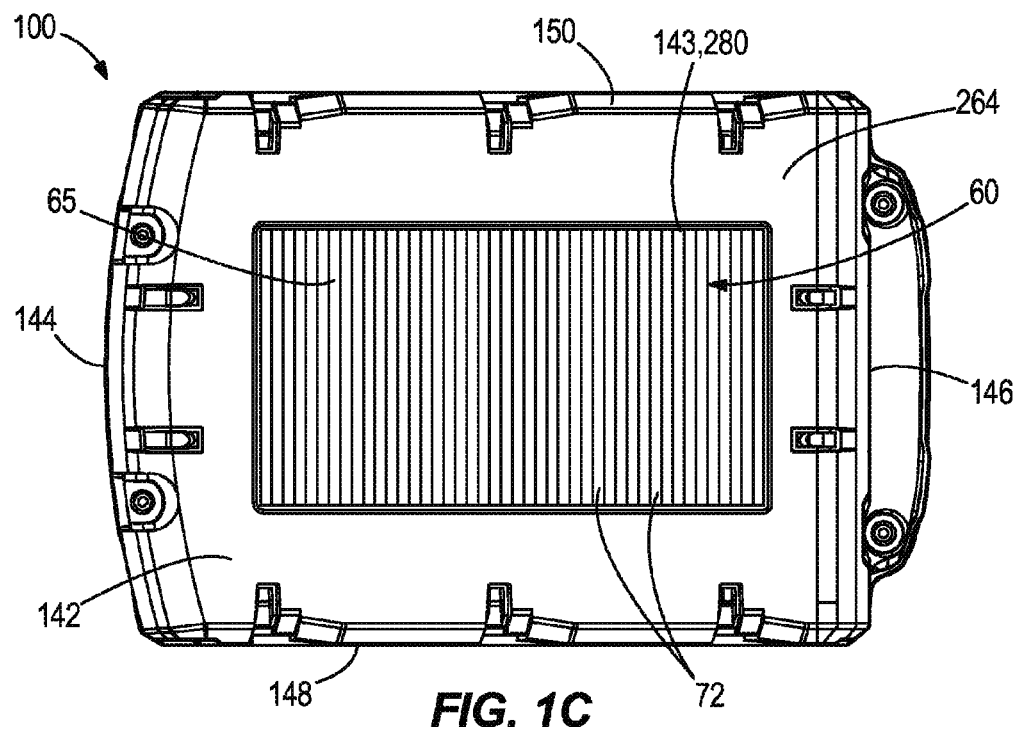

FIGS. 1A-1C illustrate a battery pack 100 according to one embodiment of the invention. The battery pack 100 includes a housing or case 112 having a first portion 114 and a second portion 116. The two portions 114, 116 of the housing 112 are coupled, for example, by fasteners (not shown) that extend through a plurality of complementary fastening holes (not shown). An interface 120 of the first portion 114, which is symmetrical about a longitudinal axis A, is able to be physically coupled to the base of a power tool (not shown). When assembled, the first and second portion 114, 116 are coupled such that the battery pack 100 includes a top wall 140, a bottom wall 142, a front wall 144, a rear wall 146, a first side wall 148, and a second side wall 150. At least one of the six walls 140-150 is constructed from a rigid plastic material. A heat sink or radiator 60, which will be discussed in greater detail below, also makes up at least a portion of the housing 112 of the battery pack 100 of FIGS. 1A-1C.

The battery pack 100 is used to power a variety of power tools and accessories, such as drill/drivers, saws, lights, detectors, and the like. The battery pack includes a plurality of battery cells, which may be lithium ion, NiCad, or another cell type.

Figure 5:
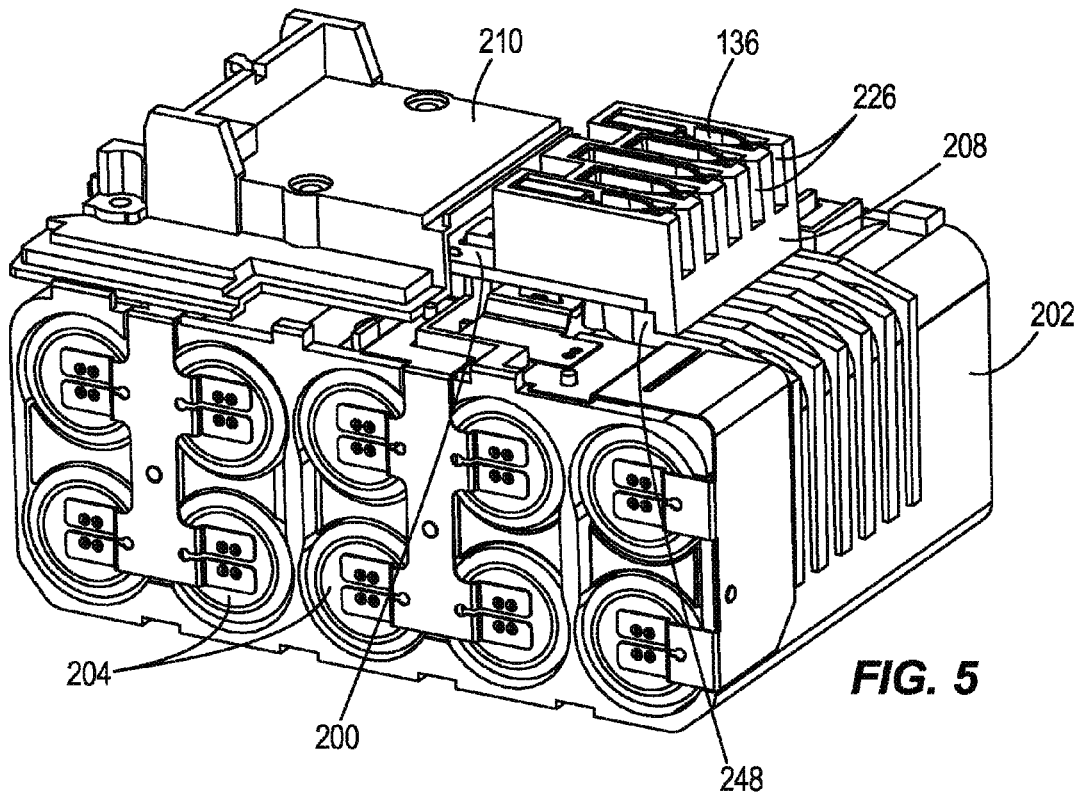
FIGS. 5-7 are additional views of the internal components included in FIG. 4.
Figure 6:
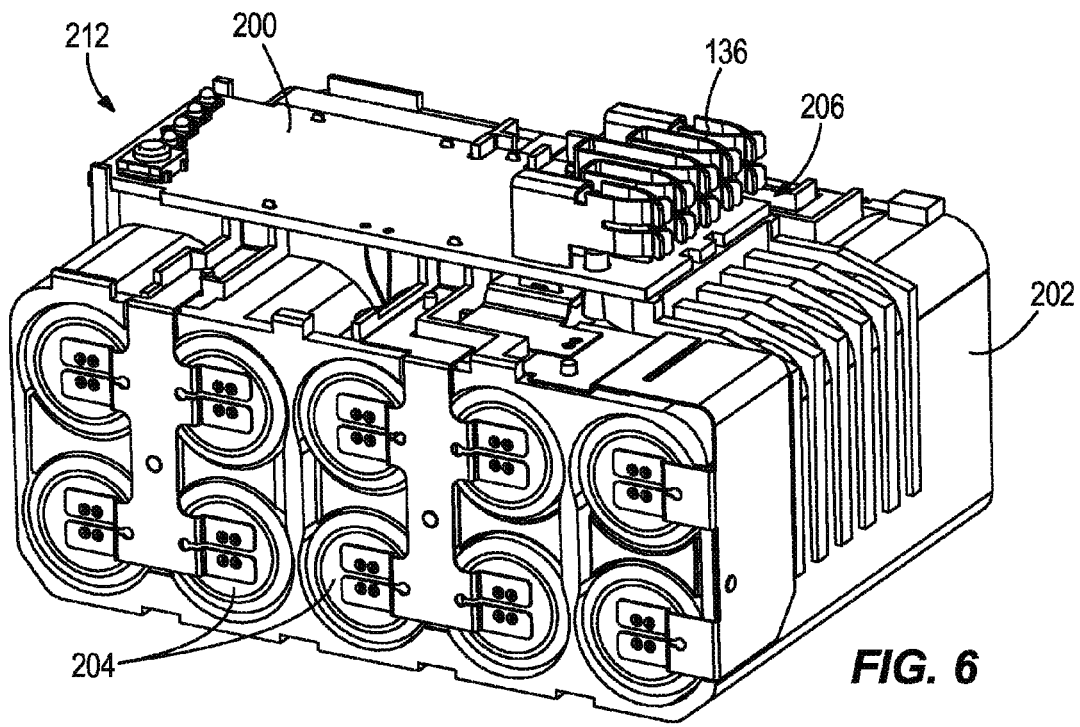
Figure 7:
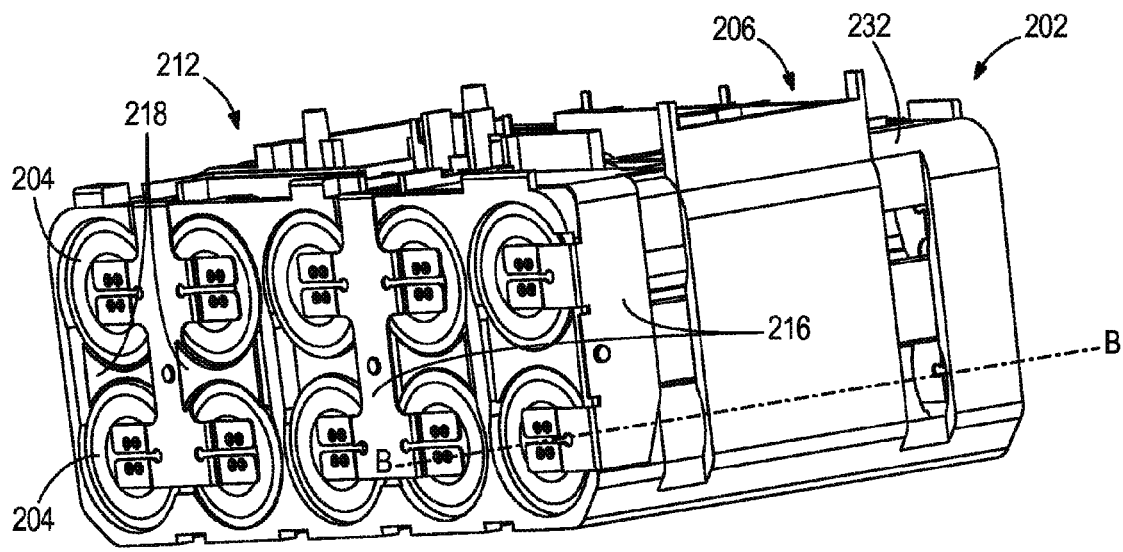

The first portion 114 includes a first and a second window or opening 122, 124, which accommodates a latch 126. The latch 126 includes a main body portion 128 and a hook portion 130 with a connecting portion 32 extending therebetween. The main body portion 28 is received within the first opening 122, while the hook portion 130 is received within the second opening 124. Although only one side of the first portion 114 is visible in the illustrated embodiment, an opposite side of the battery pack includes a similar construction such that there is a latch 126 on either side of the first portion 114. The first portion 114 further includes a plurality of openings 134 that surround terminals 136 (FIGS. 5-7). The openings 134 ensure the alignment of the electrical connection between the power tool and the battery pack 100.

Figure 2A:
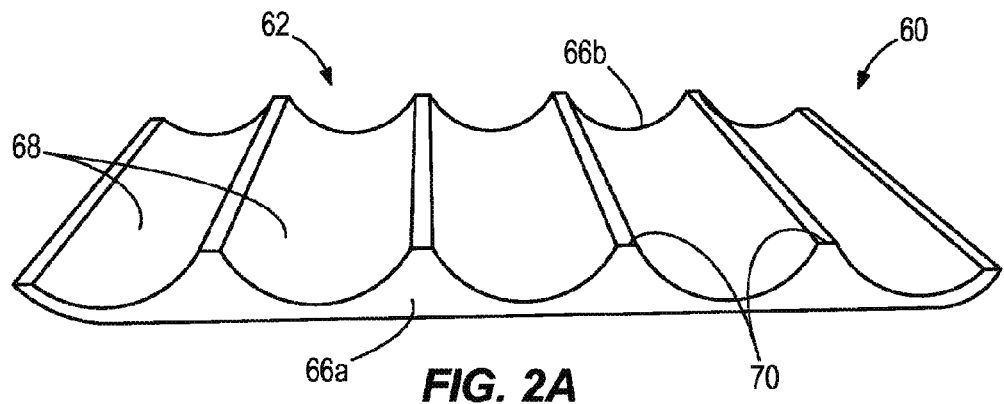
FIGS. 2A-2C are views of the heat sink of FIGS. 1B and 1C.
Figure 2B:
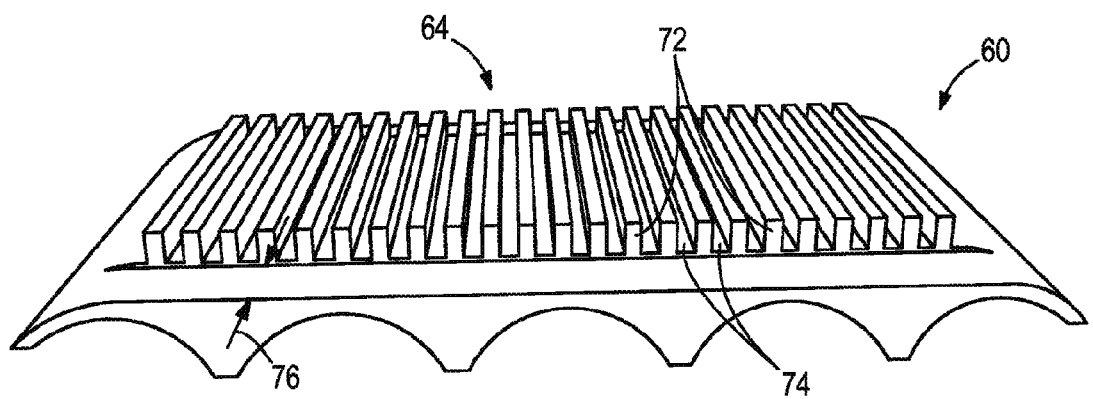
Figure 2C:
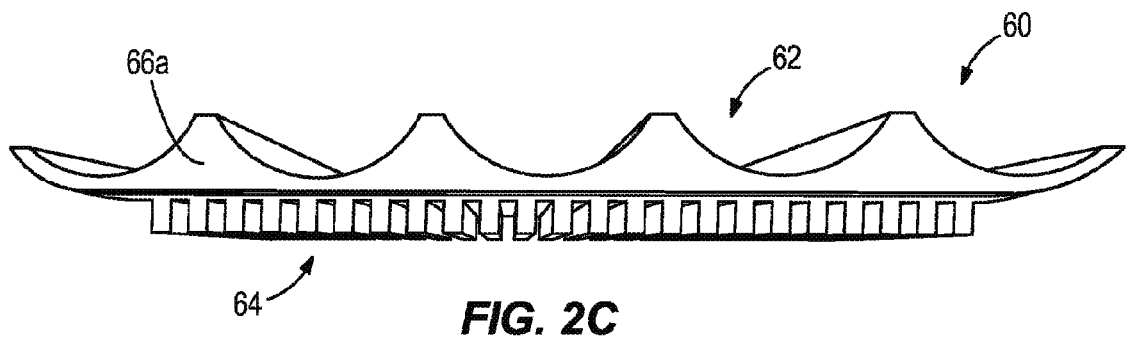

One embodiment of the heat sink or radiator 60 that makes up at least a portion of the housing 112 of the battery pack 100 of FIGS. 1A-1B is illustrated in FIGS. 2A-2C. In embodiments of FIGS. 1A-1C, the heat sink 60 forms the bottom wall 42 of the battery pack 100, although as discussed in greater detail below, the heat sink 60 may make up other portions of the housing. The heat sink 60 allows heat dissipation between external and internal environments of the battery pack 100. As such, the heat sink 60 protects the battery cells and other internal components from overheating when the battery pack is used for extended periods of time and/or with high charging/discharging rates. The heat sink 60 is constructed from a metal material (e.g., a metal constructed from aluminum, magnesium, etc.). The metal may be electrically isolated from components within the housing 12 by a material such as Nomex, Kelvar, or another suitable polymer having low thermal resistance properties. The heat sink 60 includes a top surface 62, a bottom surface 64, and two side walls 66A, 66B. In the illustrated embodiment, the top surface 62 includes a plurality of grooves 68 that extend between opposite sides 66A, 66B of the heat sink 60. The grooves 68 are separated by elevated portions 70 such that battery cells (not shown) may rest in the grooves 68. It is contemplated that the top surface 62 may have another suitable contour (e.g., the top surface may not include grooves). Depending on the size of the battery cells used, there may be more or fewer grooves as well.

The illustrated embodiment of the heat sink 60' includes a plurality of heat transfer elements. In particular, the illustrated embodiment includes a plurality of projections 72 integrally formed with the bottom surface 64. Additionally, each adjacent projection 72 (also referred to as fins) is separated by a narrow channel or valley 74. The projections 72 and channels 74 provide improved heat transfer characteristics because of increased surface area. The projections 72 in the illustrated embodiment extend along the bottom surface 64 between opposite side walls 66A, 66B; however, a space 76 is between an end of the projections 72 and each of the side wall 66A, 66B. Further embodiments may not include the projections 72 along the bottom surface. Alternatively, more or fewer projections 72 and/or smaller or larger projections 72 may be included in other embodiments. The grooves 68 and projections 72 are aligned in parallel in the illustrated embodiment, but alternate embodiments may include grooves or projections oriented perpendicularly or otherwise differently with respect to one another.

In the battery pack 100 of FIGS. 1A-1C, the heat sink 60 is an auxiliary structure. In the embodiment of FIGS. 1A-1C, the heat sink 60 of FIGS. 2A-2C is received within and secured to an inner surface (not shown) of the bottom wall 142. Stated another way, the heat sink 60 is fixed or embedded in the bottom wall 142. As illustrated, at least a portion 65 of the bottom surface 64 of the heat sink 60 extends through an aperture 143 in the bottom wall 142 such that the projections 72 are flush with the bottom wall 142. It is contemplated that other embodiments may be constructed such that the projections 72 are recessed with respect to the aperture 143 or alternatively, the projections 72 may project beyond the surface of the bottom wall 142. The battery pack 100 may also include an overmold or bottom cover 264

(FIG. 1C) in which case the portion 65 of the bottom surface 64 of the heat sink 60 extends through both the aperture 143 in the bottom wall 142 and a cutout 280 in the overmold 264. As illustrated in FIG. 1C, the aperture and the cutout of the bottom wall 142 and overmold 264 are concentric. The overmold 264 will be described in greater detail below.

In the embodiment of the FIGS. 1A-1C, the projections 72 are flush with a bottom surface of the bottom wall 142 (FIG. 1B) or the overmold 264 (FIG. 1C). It is contemplated that other embodiments may be constructed such that the projections 72 are recessed with respect to the aperture 145 and/or cutout 280 or may project beyond the bottom surface of the bottom wall 142 and/or overmold 264. Additionally, as discussed above, the heat sink 60 may include more or fewer projections or no projections (i.e., a flat surface). In the embodiments of FIGS. 1A-1C, the top surface 62 of the heat sink is located within an interior of the pack 100. This construction serves several purposes. The heat sink 60 releases heat accumulated within the pack 100, but the heat sink 60 also generally serves as an internal frame by taking up clearance between the battery cells and the walls 140-150 and securing the battery cells relative to one another. The heat sink 60 of FIGS. 1B and 1C may be secured to the bottom wall 142 by suitable means (i.e., fasteners, adhesives, and the like). Additionally, the top surface 62 may have other suitable dimensions. For example, the top surface 62 may take up the entire floor of the interior of the pack 100 or alternatively, there may be space between the walls 140-150 and the perimeter of the heat sink 60. Additionally, the heat sink 60 may have greater or fewer grooves 68 depending on the size of the battery being used; alternatively, the heat sink may not include grooves but rather have a substantially flat surface.

FIG. 3 illustrates a battery pack 100 according to another embodiment of the invention. The battery pack 100, which is similar to the battery pack 100 of FIG. 1A-1C, is illustrated in an exploded view that illustrates a second portion 116 of a housing 112 that includes a bottom wall 142, a front wall 144, rear wall 146, a first side wall 148, and a second side wall 150. Although not included in FIG. 3, the second portion 116 is coupled to a first portion (not shown) at an interface (not shown) as described above with respect to FIG. 1A. In the illustrated embodiment, the first portion and the walls 144-150 of the second portion 116 are integrally formed of a rigid plastic, while the bottom wall 142 is formed by another embodiment of a metal heat sink 60'. As such, the metal, bottom wall 142 serves as a radiator for dissipating heat created by the battery cells while in use. In the illustrated embodiment, the top surface 62' faces an inner cavity 61 of the battery pack, while the side walls 66A', 66B' interface with and are coupled to a bottom surface or portion of each of the walls 144-150. Thus, the bottom surface 64' of the heat sink 60' is also the bottom surface of the battery pack 100.

In contrast to the heat sink 60 shown in FIGS. 2A-2C, the heat sink 60' has a generally flat bottom surface 64' without the projections 72. The heat sink 60' may be secured to the battery pack 100 by fasteners, adhesives, snap-in tabs, or any other suitable securing method. The heat sink 60' is thereby fixed or embedded in the bottom wall 142. As such, heat given off by the battery cells in an inner cavity 61 is dissipated through at least a portion of the housing 112 to an external environment of the battery pack 100. Although the bottom wall 142 is constructed of metal in the illustrated embodiment, it should be understood that the upper portion and one or more of the walls 144-150 of the second portion 116 may also be constructed of a metal material. Further, while only the bottom wall 142 is constructed of metal in the illustrated embodiment, any number and combination of walls 142-150 may be constructed from metal thereby creating a heat sink out of any wall or portion of any wall.

FIGS. 3A-H, 3J-3K, and 3M illustrate a few of the potential combinations of walls and/or portions being constructed from plastic or metal. FIGS. 3A-3H illustrate battery packs 100a-100h having first portions 114a-114m and bottom portions 116a-116h, respectively. The portions shown with hatching are formed with metal to function as a heat sink for the battery packs 100a-100h. In FIGS. 3A-3H, the battery packs 100a-100h are illustrated in simplified form as cuboids for ease of understanding. However, embodiments of the battery packs 100a-100h may take a form more closely resembling battery pack 100 of FIG. 1. Moreover, each heat sink 60 portion may or may not include projections 72 and channels 74. In other words, the heat sinks of FIGS. 3A-3H could be constructed as the heat sinks 60, 60' of either of FIGS. 2A-2C or FIG. 3, respectively.

In the embodiment illustrated in FIG. 3, an internal frame that holds the battery cells (not shown) may be eliminated because the battery cells rest directly in the grooves 68 of the heat sink 60. In the particular embodiment of the heat sink 60' illustrated in FIG. 3, the battery cells would be oriented perpendicularly with respect to the longitudinal axis A of the battery pack 100. A single row of battery cells is accommodated by the illustrated heat sink 60'. Alternatively, an internal frame 202, which will be described in further detail below, may be used to secure one or more rows of battery cells within the battery pack 100. The use of the internal frame 202 reduces the need for the grooves 68 and, therefore, the heat sinks 60, 60' may have another suitable contour on the top surface 62, as described above. Should the heat sinks 60, 60' be used as the material for one or more of the other walls 144-150, instead of or in addition to the bottom wall 142, the contour may be specific to the wall or portion of the wall for which the heat sink is used. For example, if the heat sink 60' is used to construct one or more of the side walls, the battery cells may be oriented vertically, the direction of the grooves may be adjusted (i.e., rotated by 90 degrees), or eliminated completely in favor of an alternative surface contour for the surface facing the battery cells.

Figure 3J:
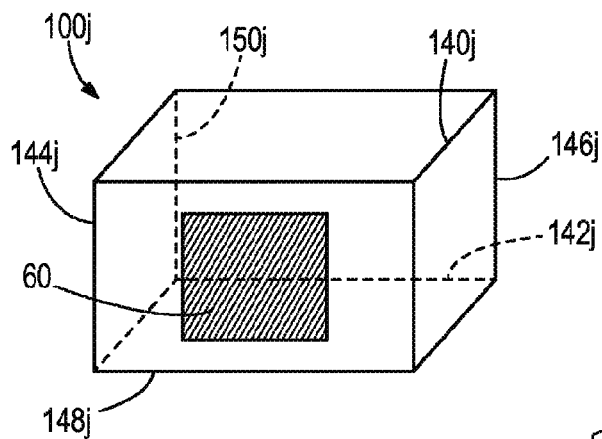

FIG. 3J illustrates a battery pack 100j that includes a cutout in at least one of the walls. Secured within the cutout is a heat sink 60 similar to the one described above with respect to FIGS. 2A-2C or FIG. 3. As such, only a portion of the wall (e.g., wall 148j) includes a radiator therein. FIG. 3J illustrates that rather than the battery pack 100j having coupled first and second portions each forming a portion of a cavity, the walls of the battery pack 100j fit together to form a cavity therein. In the illustrated embodiment the second side wall 148j includes a portion constructed as a heat sink 60. It should be understood, however, that any or all of the walls 140j-150j may include a portion that accommodates a heat sink 60. Additionally, more than one wall may include a portion that accommodates a heat sink, and further, any combination of one or more walls may include a portion constructed of a heat sink 60. Similarly, it should be understood that the heat sink 60 may have other suitable dimensions and that the ratio of plastic wall portion to the heat sink 60 portion is merely exemplary.

Figure 3K:
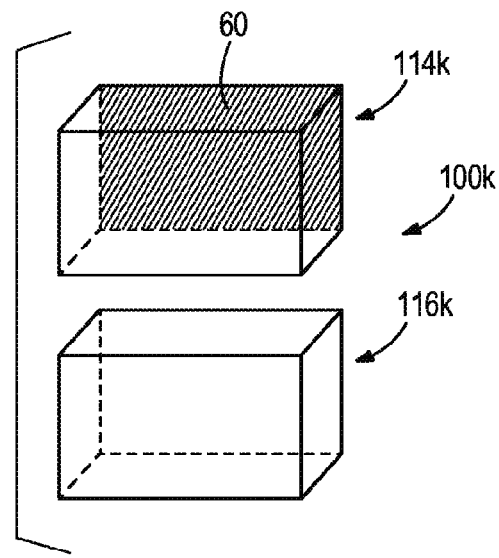
Figure 3M:
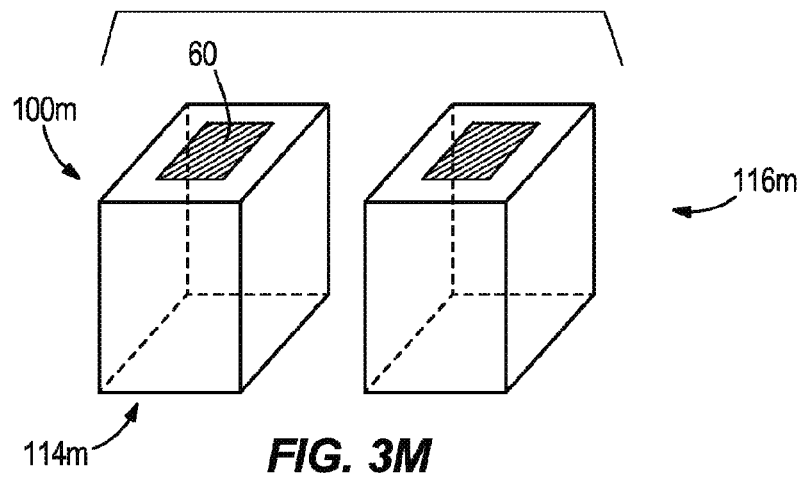

FIG. 3K illustrates a battery pack 100k that includes a first portion 114k being a top half of a clamshell and a second portion 116k being a bottom clamshell half. Similarly FIG. 3M illustrates a battery pack 100m that includes a first portion 114m being a right half of a clamshell and a second portion 116m being a left clamshell half. In either embodiment, the first clamshell half 114*k,m* is coupled to the respective second clamshell half 116*k,m*, for instance, by fasteners (not shown) or adhesive (not shown) extending therebetween. FIGS. 3K and 3M are merely examples of how the heat sink 60 may make up a portion of the outer surface of the battery pack. As illustrated, a wall of the clamshell half (FIG. 3K) may include a heat sink 60 or a portion of a wall of the clamshell half (FIG. 3M) may include a heat sink 60. As discussed above, at least one wall or at least a portion of one wall is constructed from the heat sink 60. However, more than one wall may include the heat sink. Additionally, the heat sink 60 may take up a larger or smaller portion of the one or more walls that include the heat sink 60. Both clamshell halves 114*k,m* and 116*k,m* may be constructed out of the heat sink 60 (such that the whole outer surface being constructed from the material that makes up the heat sink 60 exemplified in FIGS. 2A-2C or FIG. 3).

It should be understood that other types and constructions of battery pack may include a portion of an outer surface being constructed from a heat sink, similar to one described above with respect to FIGS. 2A-2C. While many examples of potential constructions are discussed and illustrated herein it should be understood that the examples are in no way limiting to the scope of the invention. Therefore, the principles presented herein are applicable to slide battery packs (i.e., battery packs that slide horizontally into place), such as the ones illustrated here, and also to stem battery packs (i.e., battery packs that include a stem projecting from a top surface of an outer housing and which are inserted vertically into a hollow cavity of a power tool).

In addition to having one or more walls or one or more portions of one or more walls being constructed as a heat sink 60, the battery pack 100 may include other features as well. With respect to FIGS. 4-7, the battery pack 100 may include a printed circuit board (PCB) 200 that is physically coupled to the internal frame 202 that secures a plurality of battery cells 204 within the second portion 116 of the housing 112. The terminals 136 project from a distal end 206 of the PCB 200 in the first portion 114. The terminals 136 and distal end 206 of the PCB 200 are covered by a terminal block or cover 208, while a latch block or cover 210 covers the PCB 200 on a proximal end 212. The latch cover 210 is located below the latches 126.

FIGS. 4-8 illustrate the internal frame 202. The internal frame 202 is constructed as a single piece and includes openings 214 and weld straps 216. The openings 214 are sized to accommodate lithium ion battery cells 204 having a longitudinal axis B. In some instances, battery cells 204 are of a chemistry type different than lithium ion, such as NiCad. The battery cells 204 are secured within the openings 214 by wedges 218 (FIGS. 4-8 and 9). The wedges 218 include a first recessed portion 220 and a second recessed portion 222 that are approximately the same size and shape as the battery cells 204 such that the battery cells 204 rest within the recessed portions 220, 222. The wedges 218 enable the use of the different sized battery cells to be stacked within the openings 214. The weld straps 216 interconnect the battery cells 204 to one another and also couple the battery cells 204 to the PCB 200. The internal frame 202 includes channels 224 that are aligned with channels 226 of the terminal block 208. In the illustrated embodiment, the battery cells 204 are oriented horizontally such that the longitudinal axis B is perpendicular to the axis A of the battery pack 100. The battery cells 204 are also stacked vertically in rows within the openings 214 of the frame 202. In further embodiments, the frame 202 includes openings 214 such that the battery cells 204 are oriented in other suitable directions. Further, while the recessed portions 220, 222 and the openings 214 in the illustrated embodiment are substantially semi-circular and ovular, respectively, further embodiments include recessed portions and openings of alternative sizes and shapes in order to receive battery cells of alternative sizes and shapes. Additionally, the internal frame 202 may accommodate more or fewer rows of battery cells. Alternative embodiments of the internal frame 202 may also be configured to secure vertically oriented battery cells. While the illustrated embodiment is integrally formed as a single piece, the frame may be constructed as two clam shells (e.g., left and right clamshell halves and/or top and bottom clamshell halves) and secured via fasteners or any other suitable method to secure the battery cells therein.

Figure 4:
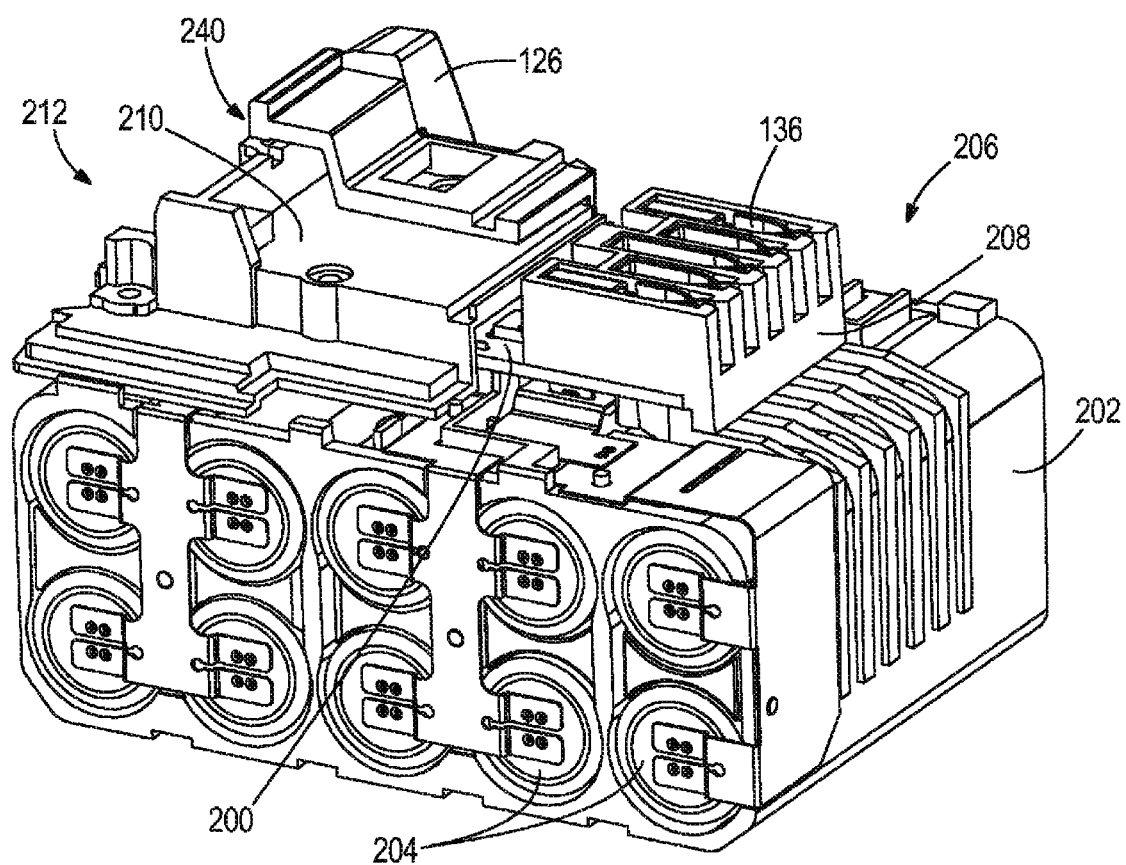
FIG. 4 is a perspective view of internal components of a battery pack including at least an internal frame that holds a plurality of battery cells, wedges that secure the plurality of battery cells in rows, a latch cover, a terminal cover, and a printed circuit board.
Figure 8:
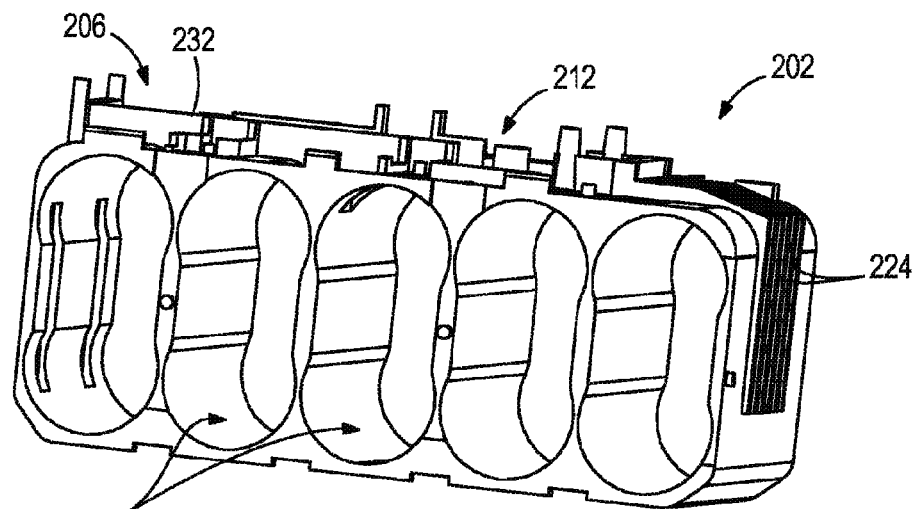
FIG. 8 is a perspective view of the internal frame of FIG. 4.
Figure 9:
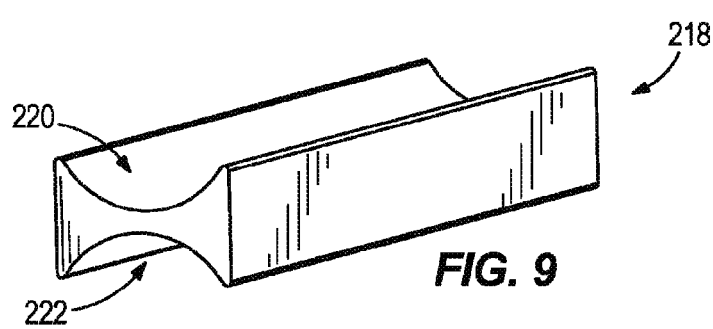
FIG. 9 is a perspective view of a wedge of FIG. 4.
Figure 10:
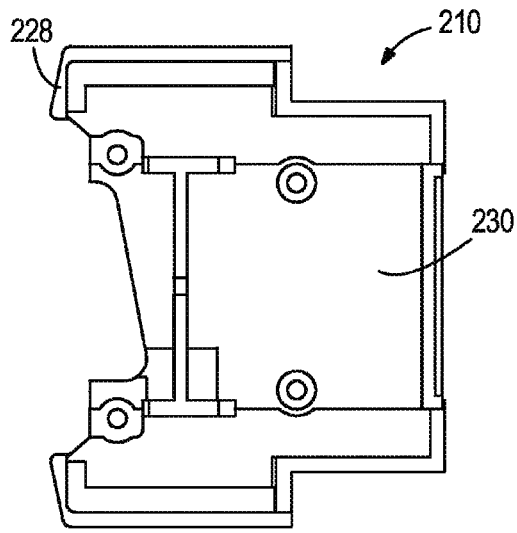
FIGS. 10-13 are views of the latch cover of FIG. 4.
Figure 11:
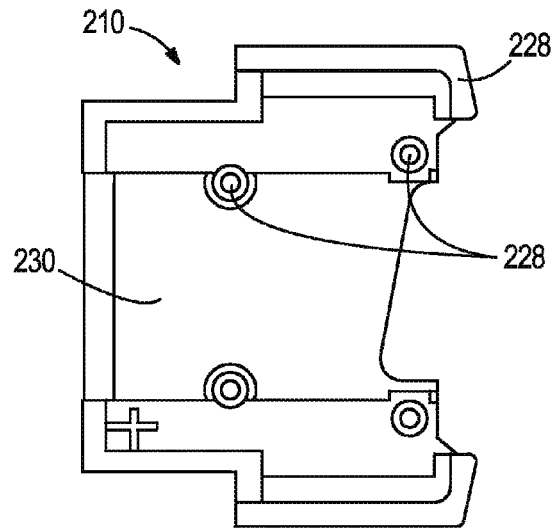
Figure 12:
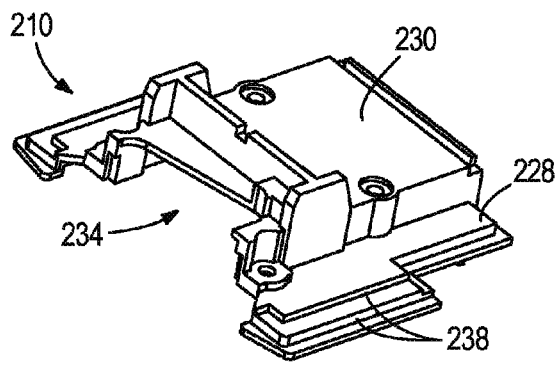
Figure 13:
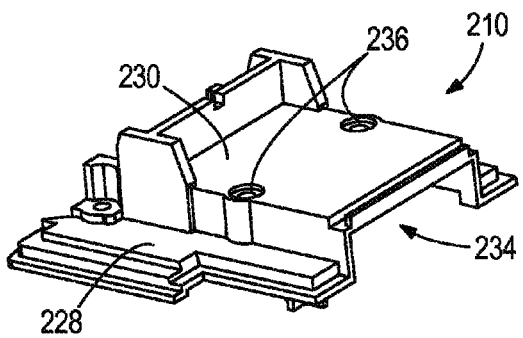
Figure 14:
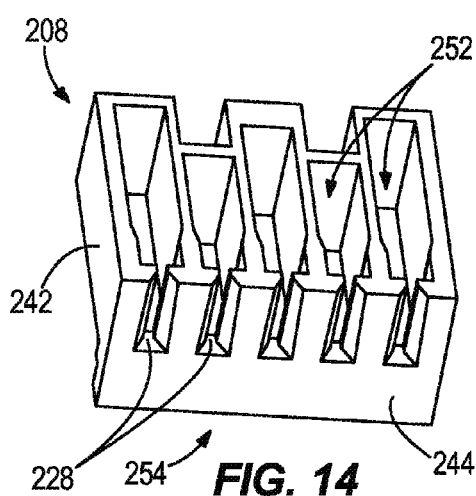
FIG. 14-15 are perspective views of the terminal cover of FIG. 4.
Figure 15:
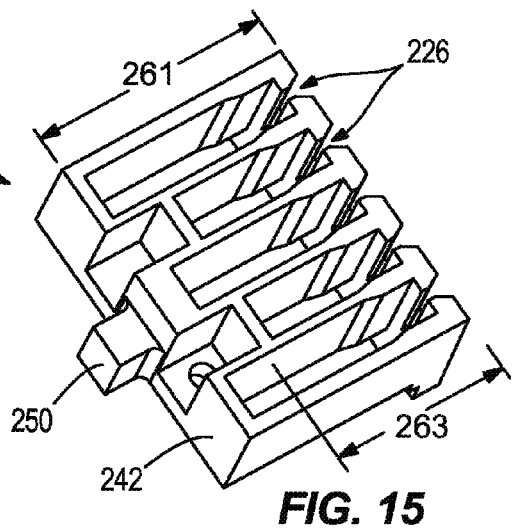
Figure 16:
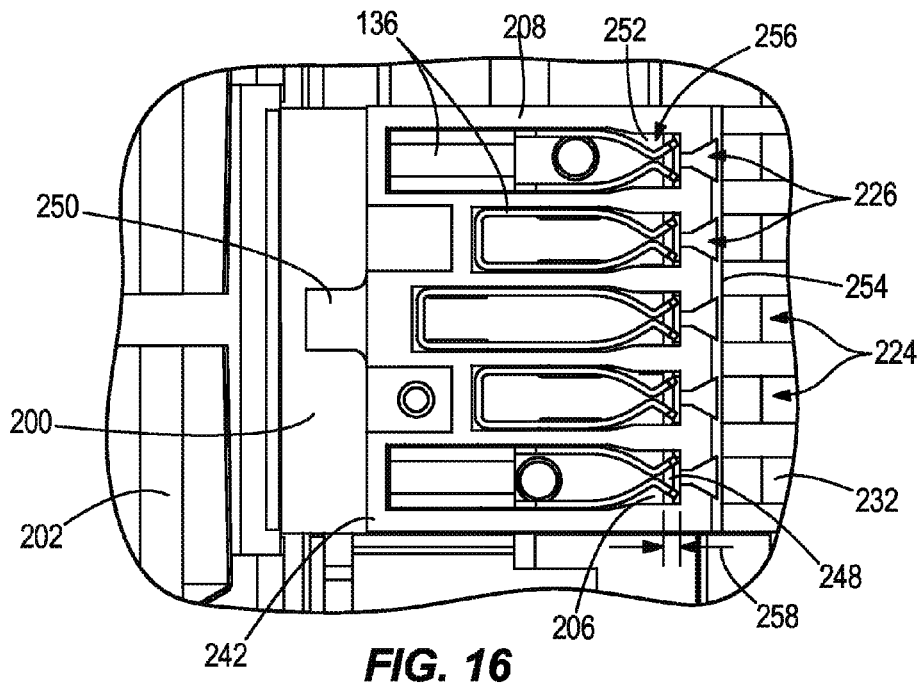
FIG. 16 is a top view the terminal cover of FIG. 4 relative to other internal components of the battery pack.
Figure 17:
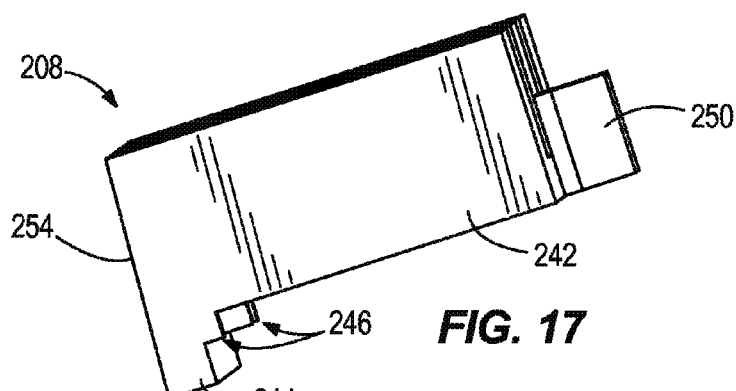
FIG. 17 is an additional perspective view of the terminal cover of FIG. 14.
Figure 18:
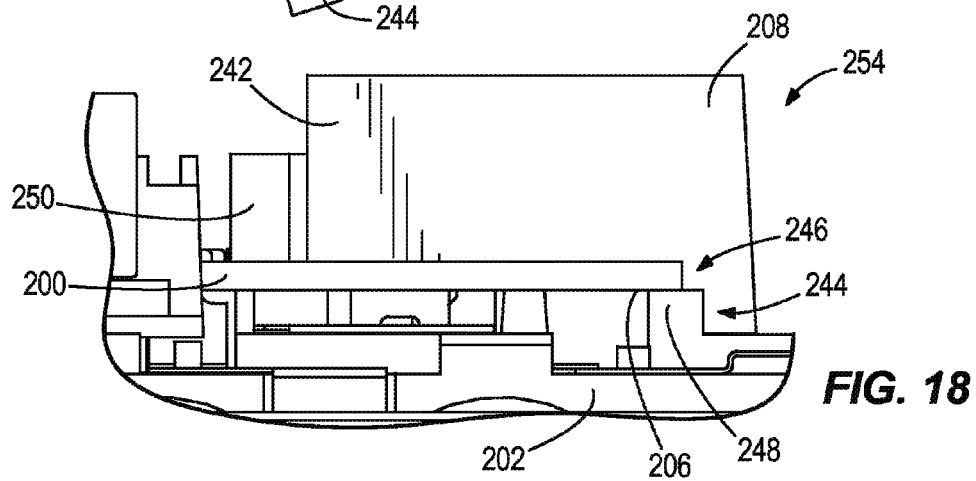
FIG. 18 is a side view of the terminal cover of FIG. 14 relative to other internal structures of the battery pack in FIGS. 4-9.
Figure 19:
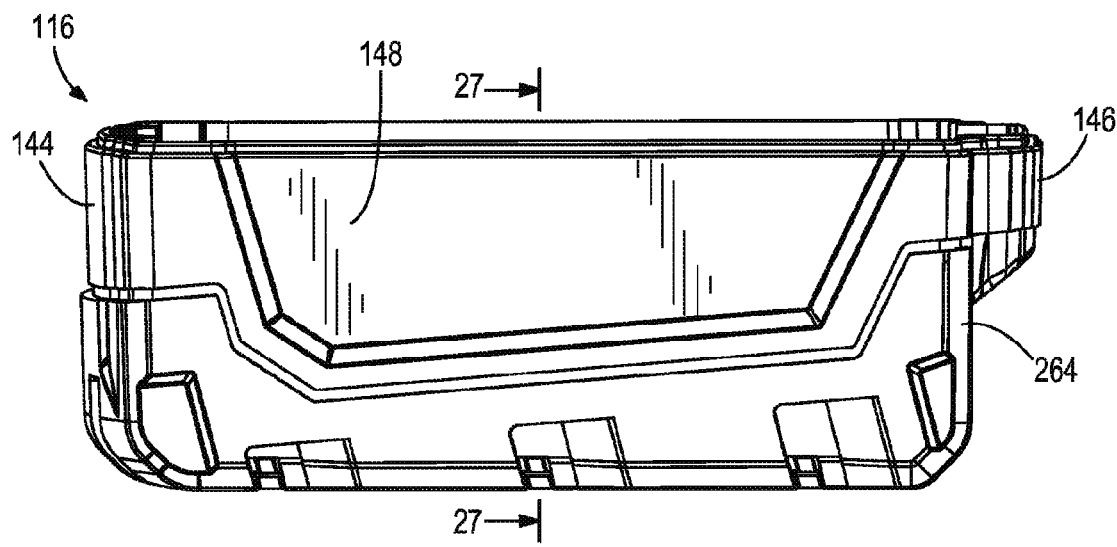
FIG. 19 is a side view of the second portion including an overmold.
Figure 20:
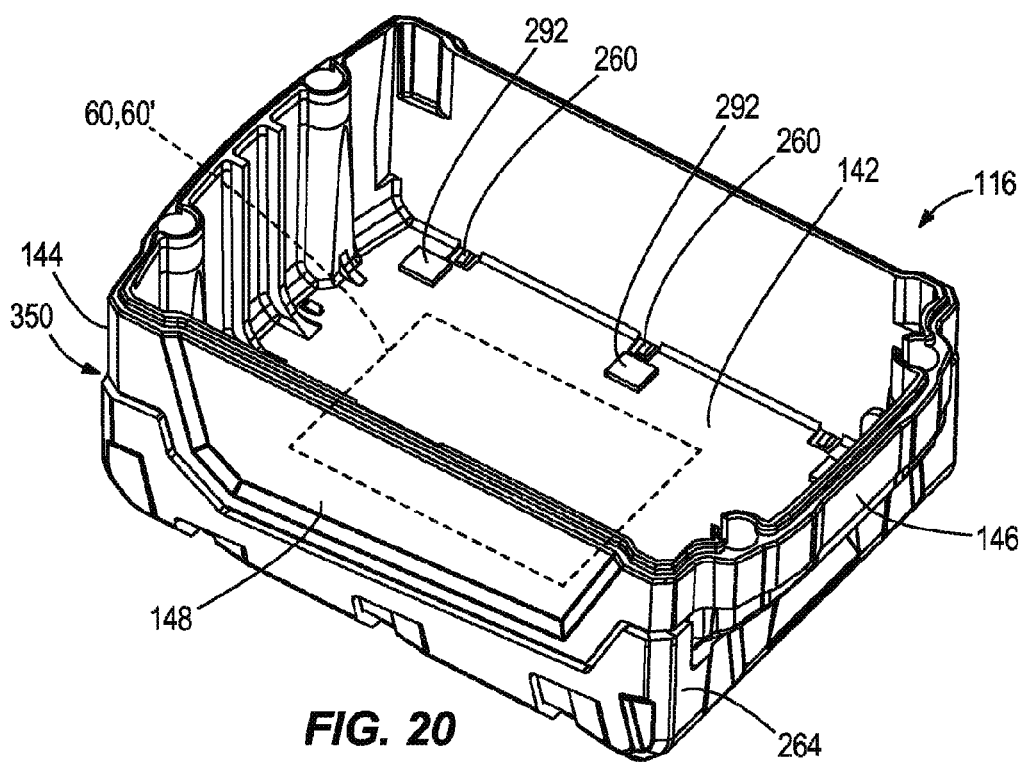
FIG. 20 is perspective view of the second portion and an overmold of the battery pack of FIG. 19 with all internal components removed thereby illustrating a cavity of the second portion.
Figure 21:
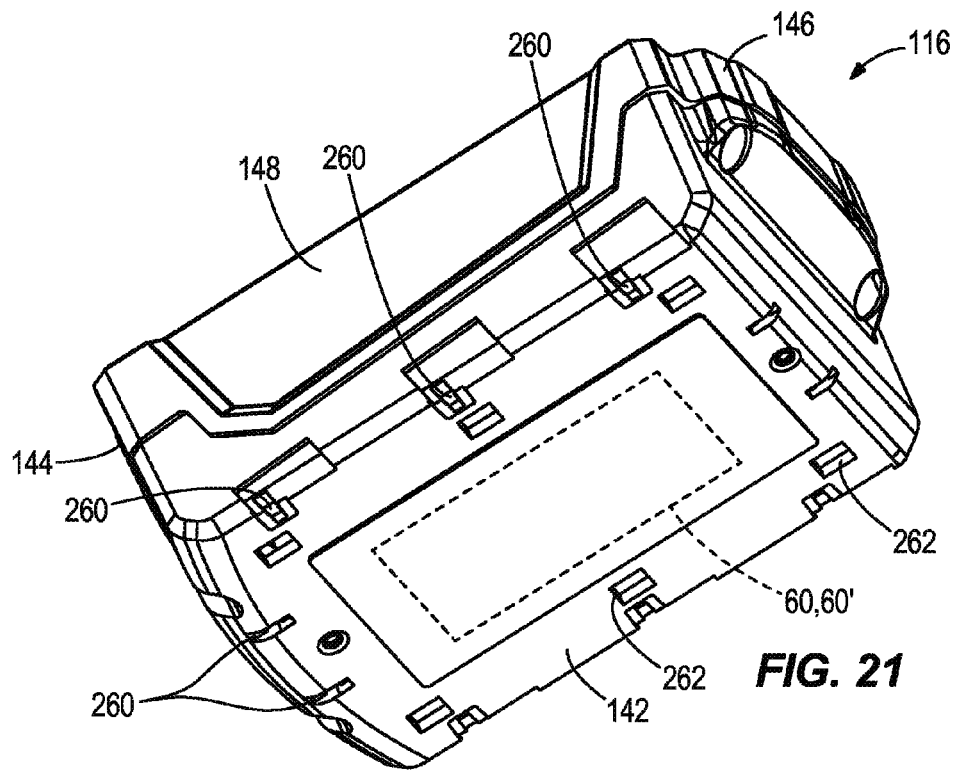
FIGS. 21-22 are perspective views of the second portion of FIG. 20 with the bottom cover removed.
Figure 22:
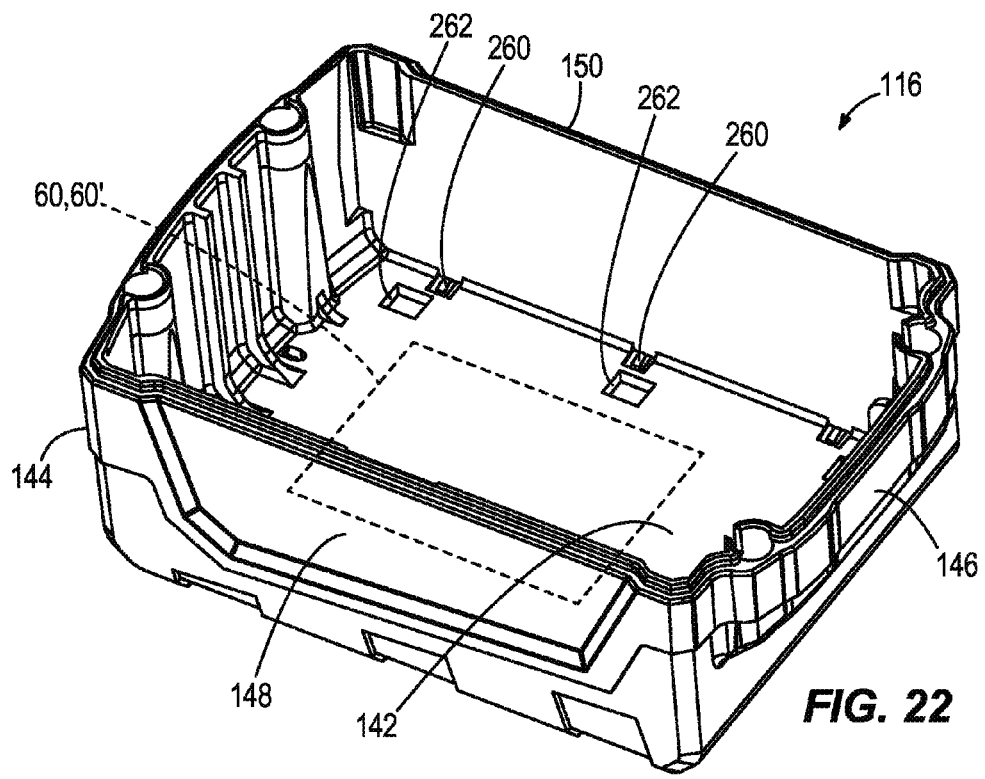
Figure 23:
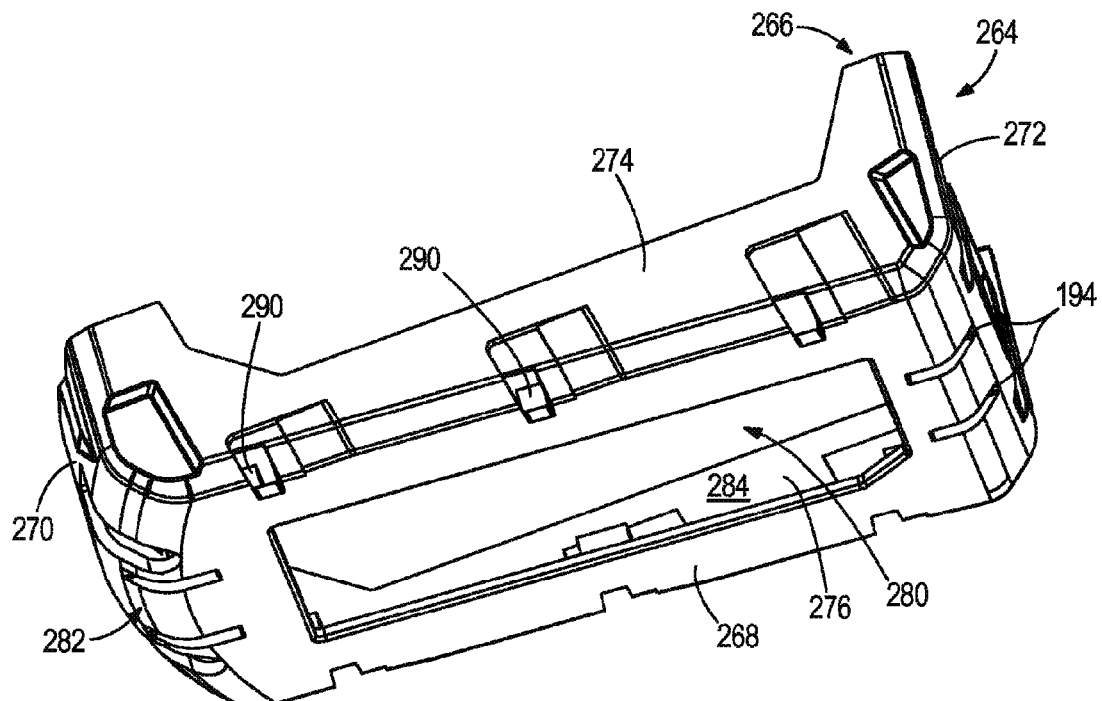
FIGS. 23-24 are perspective views of the bottom cover of FIG. 20 removed from the second portion.
Figure 24:
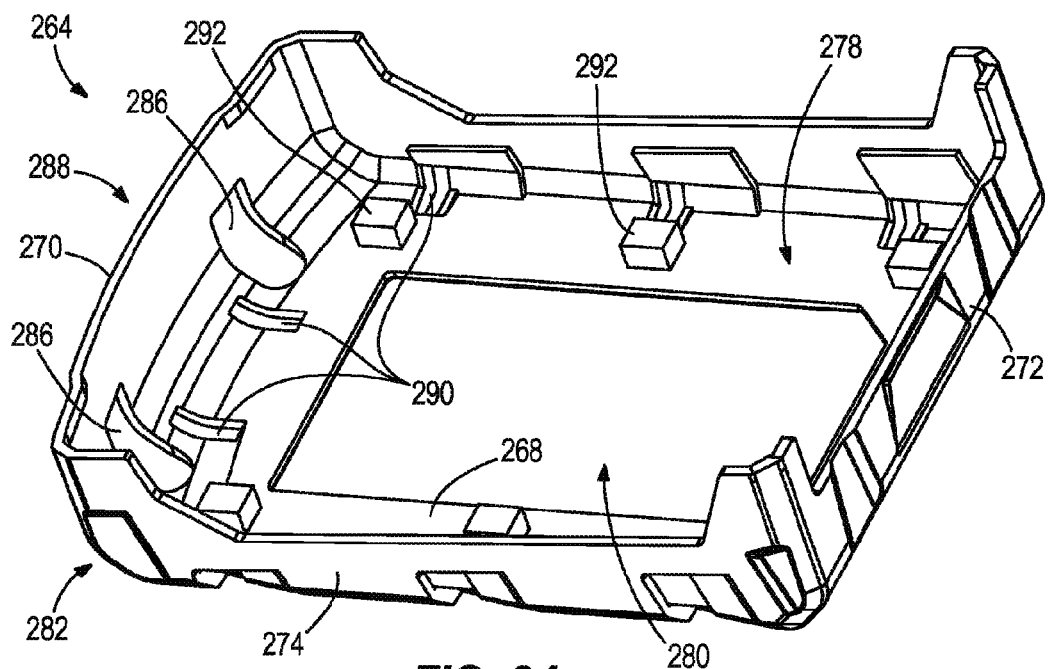
Figure 25:
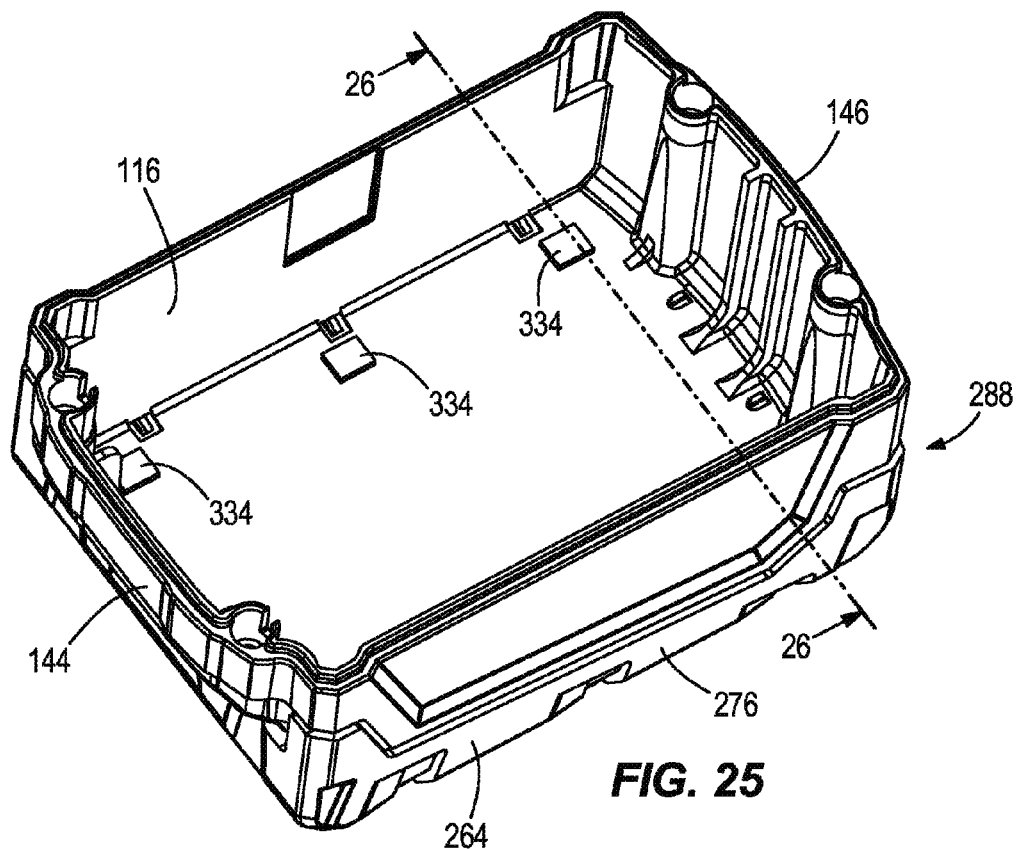
FIG. 25 is an additional perspective view of the second portion and an overmold of the battery pack of FIG. 19.
Figure 26:
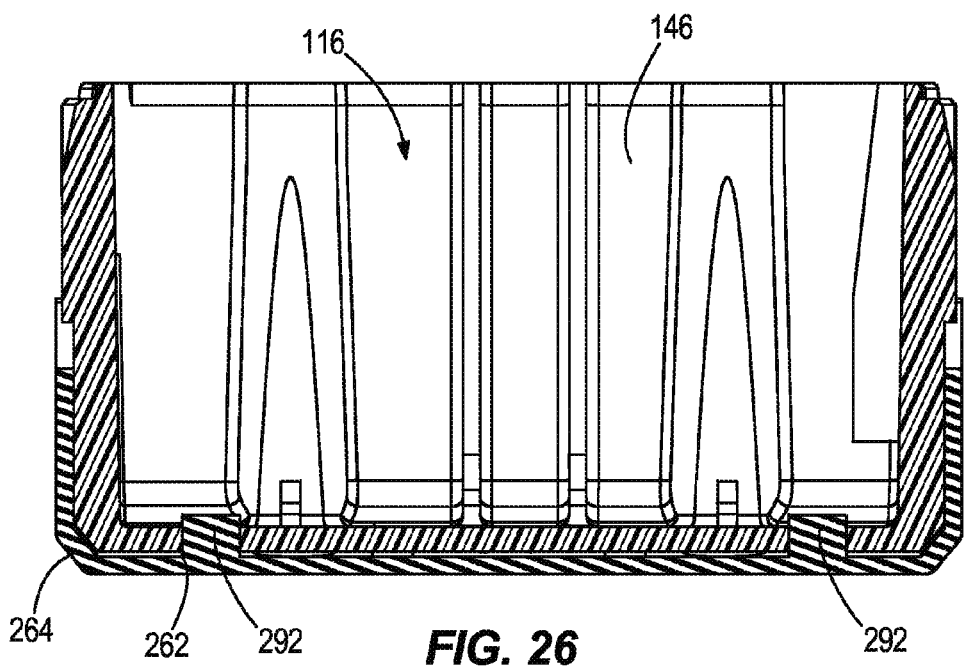
FIG. 26 is a cross-sectional view of the second portion and the bottom cover of FIG. 25 along 26-26.
Figure 27:
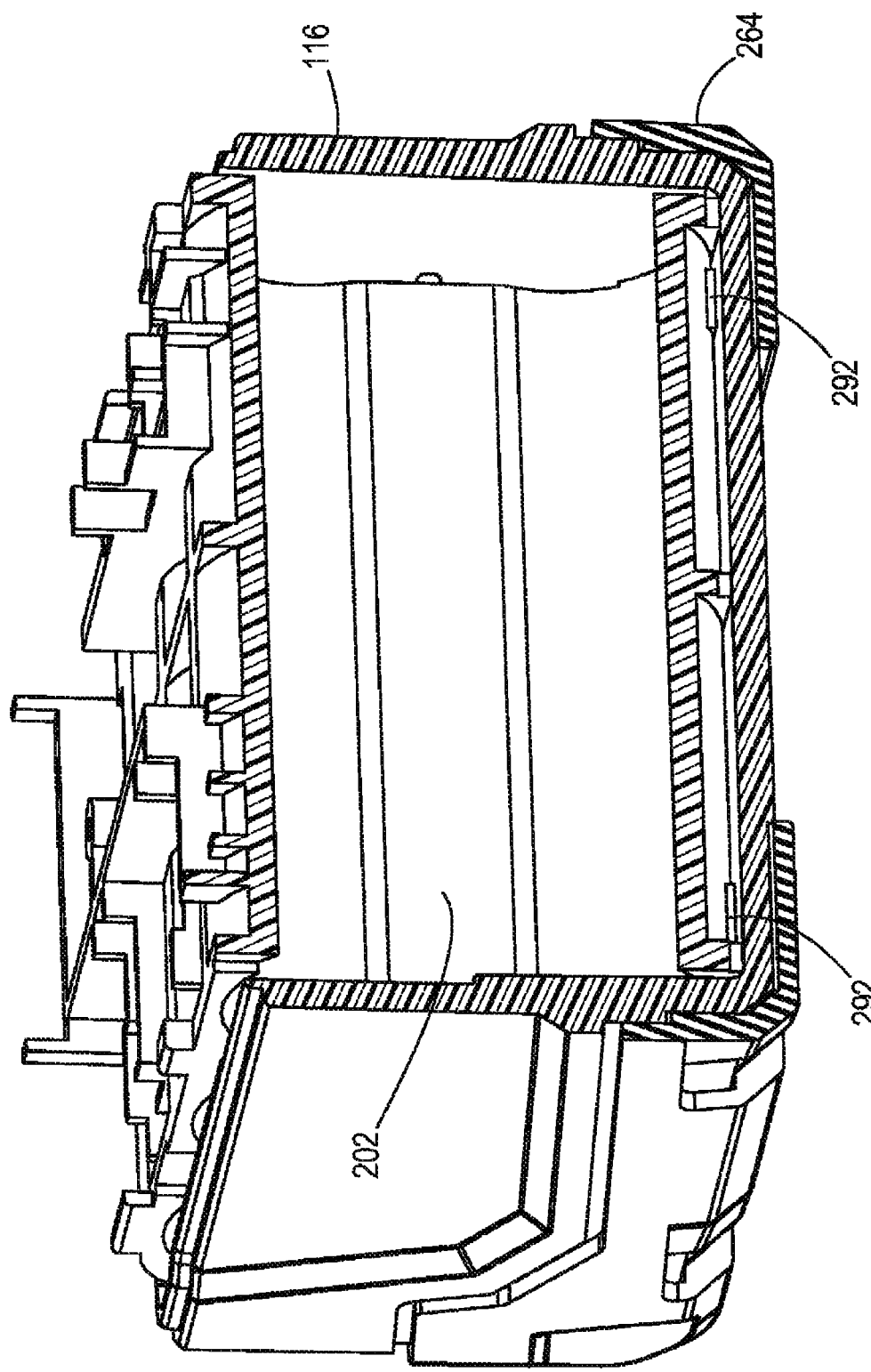
FIG. 27 is a cross-sectional view of FIG. 19 along 27-27 illustrating the second portion and the bottom cover relative to an internal frame that secures internal battery cells.
Figure 28:
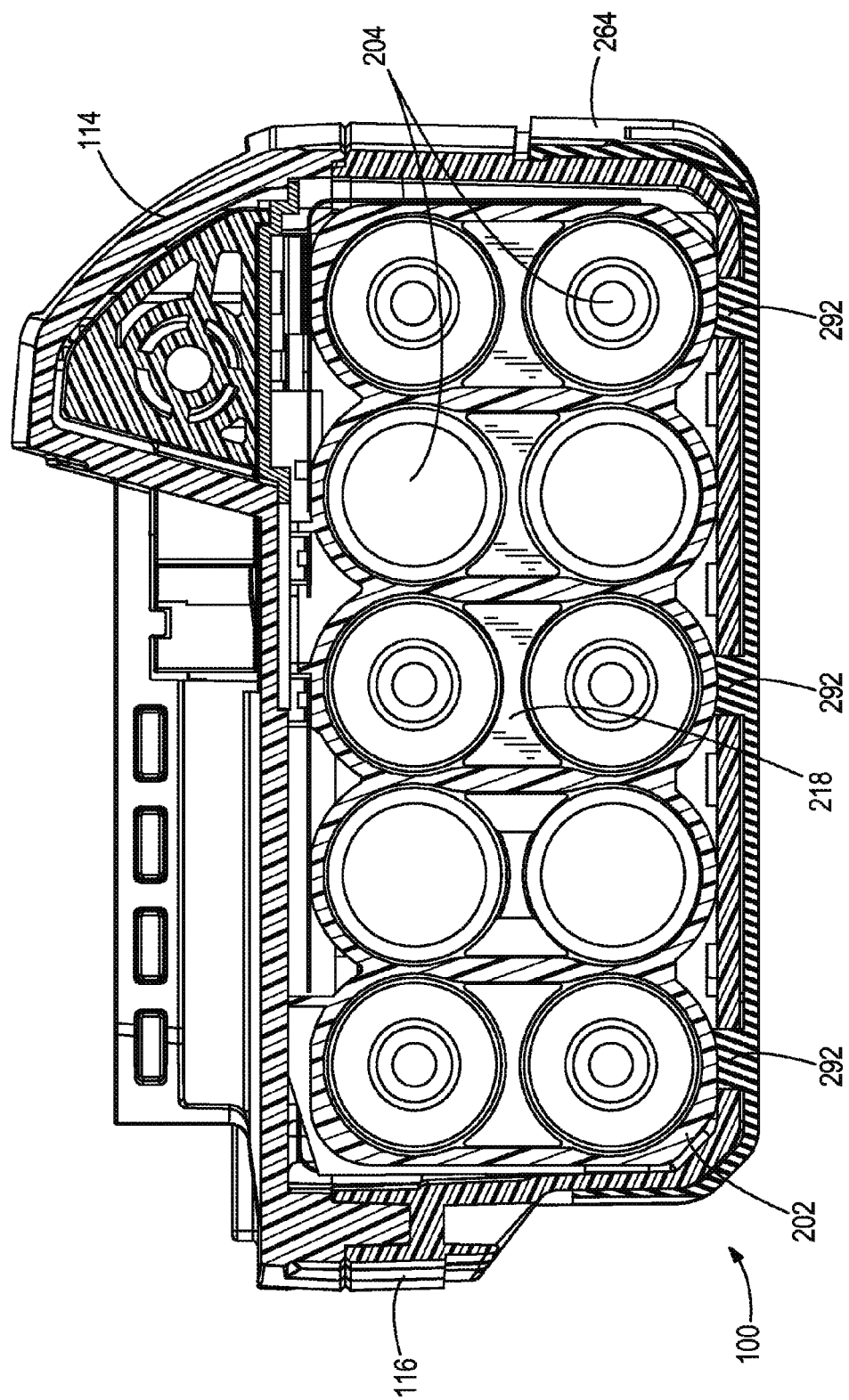
FIG. 28 is a side view of the battery pack of FIG. 19 having a side wall removed and illustrating the second portion and the bottom cover relative to a first portion that creates the top of the cavity and an internal frame that secures battery cells.

FIGS. 10-13 illustrate the latch cover 210 in greater detail. The latch cover 210 is described in conjunction with the battery packs 100 of FIG. 1A-1C and FIG. 3. The latch cover 210 is to prevent water infiltration into the battery pack 100, and also protects the PCB 200 by preventing water that enters the battery pack 100 between the first portion 114 of the housing 112 and the latches 126 from reaching the PCB 200. The latch cover 210 includes a base portion 228 and an elevated portion 230. The base portion 228 is located on an upper portion 232 of the internal frame 202 (FIG. 8). The base portion 228 includes plurality of channels or projections 238 and is partially visible while the battery pack 100 is assembled (FIG. 1A). The elevated portion 230 creates a space 234 above the PCB 200. The latches 126 fit snugly on opposite sides of the latch cover 210 and define a space 240 therebetween (FIG. 4). In the illustrated embodiment, the latch cover 210 is secured to the top cover 114 by fasteners (not shown) that extend through a plurality of fastening holes 236. However, in further embodiments the latch cover 210 may be secured to the internal frame 202. Together, the base portion 228 and the elevated portion 230 protect the PCB 200 by redirecting water between the internal frame 202 and the second portion 116 of the housing 112 towards the overmold 264, which will be described in greater detail below, where it is expelled through the holes of the second portion 116 and the overmold 264.

FIGS. 14-18 illustrate the terminal cover 208 in greater detail. The terminal cover 208 is described in conjunction with the battery packs 100 of FIG. 1A, but may also be used in battery pack 100 of FIG. 3. The terminal cover 208 includes a first portion 242, which rests on the distal end 206 of the PCB 200, and a second portion 244 that extends below the distal end 206 of the PCB 200, which rests on the upper portion 232 of the internal frame 202. The terminal cover also includes a tooth 246 on each side of terminal cover 208, which rests on a projection 248 of the internal frame 202. The terminal cover 208 includes a projection 250, which also rests against the PCB 200. The terminal cover 208 further includes openings 252 having channels 226 on a distal end 254 of the terminal cover 208. The terminals 136 are received within the openings 252 such that portions 256 of the terminals 136 abut the terminal block 208 at the distal end 254 thereby preventing water from entering the battery pack 100. The channels 226 assist in aligning the female terminals 136 of the battery pack 100 and the male terminals of the power tool (not shown). Further, in the event that water should enter between the first portion 114 of the housing 112 and the terminals 136, there is a gap 258 between the distal end 206 of the PCB 200 and the terminal block 208 that prevents water from reaching the PCB 200. The portion 248 of the internal frame 202 is located below gap 258 so that water falls through the gap 258 and is redirected towards bottom of battery pack 100 and through the holes 290, 260 of the second portion 116 and the overmold 264 via the channels 224 of the internal frame 202. Because the terminals 136 have various sizes and the openings 252 are sized to accommodate the terminals 136, the openings 252 may have different dimensions. For example, the terminal cover 208 has a first length 261 and a second length 263 associated with different terminal blade sizes of the terminals 136.

FIGS. 19-29 and the description thereof generally focus on aspects of the battery pack 100 other than the heat sink 60, 60'. Accordingly, only a dashed line representation of a potential position of the heat sink 60, 60' is included in some of these illustrations.

With reference to FIGS. 19-22 and 25, the second portion 116 of the housing 112, which may be constructed from the heat sink 60, 60' as described above with respect to FIGS. 1B and 1C, may include a plurality of holes 260 in the bottom wall 142. The bottom wall 142 may also include a plurality of apertures 262. The holes 260 and apertures 262 extend from the outer surface 216 of the battery pack 100 to the inner surface 218. The holes 260 and the apertures 262 may be offset relative to one another. The holes 260 and apertures 262 may be created by extrusion or any other suitable manufacturing process. In the illustrated embodiment, there are eight holes 260 and six apertures 262; further embodiments may include fewer or more holes 260 and apertures 262.

The battery pack 100 may also include the overmold 264 illustrated in FIGS. 19-20 and 23-29. The overmold 264 includes a body 266 having a bottom wall 268 integrally formed with four side walls 270-276 creating a cavity 278 therein. An upper boundary of the cavity 278 is defined by the four side walls 270-276. The bottom wall 268 defines a rectangular opening or cutout 280, which exposes the heat sink 60, 60'. The overmold 264 has an outer surface 282 and an inner surface 284. The overmold 264 accommodates the insertion and removal of fasteners (not shown) via two through-holes 286 on a first end 288. The overmold 264 also includes a plurality of holes or openings 290 that extend from the bottom wall 268 to the side walls 270-276. The overmold 264 additionally includes a plurality of bumpers or projections 292 that are integrally formed with the inner surface 284. In the illustrated embodiment, the overmold includes at least eight holes 290 and six bumpers 292. Further embodiments may include more or less holes and bumpers.

Figure 29:
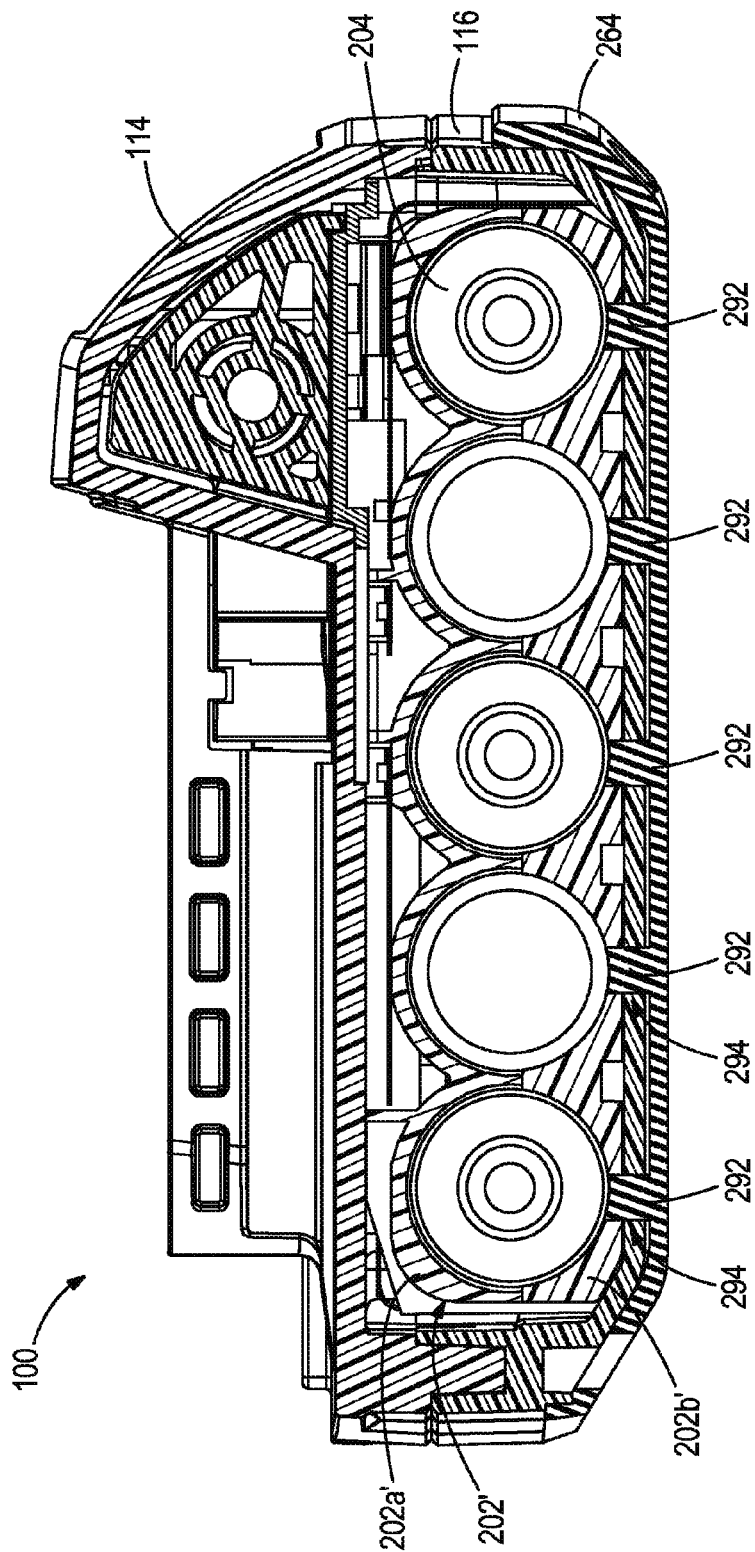
FIG. 29 is a side view of another embodiment of a battery pack having a side wall removed and illustrating the second portion and the bottom cover relative to an alternate internal frame that secures battery cells.

FIGS. 19-20 and 25-29 illustrate that, when assembled, the overmold 264 overlays the second portion 116 of the battery pack 100. The bumpers 292 of the overmold 264 extend through the apertures 262 in the second portion 116, which further ensures the proper alignment of the overmold 264 with respect to the second portion 116. In the embodiments illustrated in FIGS. 27 and 28, the internal frame 202 sits on the bumpers 292. Alternatively, FIG. 29 illustrates another embodiment that includes an internal frame 202' having a first frame member 202a' and a second frame member 202b' that, together, support a single row of battery cells 204. The second frame member 220b' includes apertures 294 that receive bumpers 292 in the overmold 264. In the embodiment illustrated in FIG. 33, an aperture 294 and bumper 292 are associated with each battery 204; in alternate embodiments, the number of bumpers and apertures do not equal the number of battery cells housed within the battery pack 100. In either embodiment, the bumpers 292 take up tolerance between the internal frame 202, 202' and the second portion 116 of the battery pack 100, and also function as shock-absorbers if the pack 100 is dropped or under conditions of high vibration. Additionally, the overmold 264 improves the user's grip, for instance, when inserting the battery pack and removing the battery pack into and from the power tool. The overmold 264 also prevents the battery pack from sliding across surfaces. When the overmold 264 overlays the second portion 116 of the battery pack 100, the holes 290 in the overmold 264 are aligned with holes or openings 260 in the second portion 116 of the housing 112. The bottom holes 290, 260 are drain holes that allow water that infiltrates the cavity 278 to exit the housing 112 rather than pooling inside the cavity 278. The contours of the second portion 116 and the overmold 264 are complimentary. In embodiment of FIGS. 19-28, the number of holes 290 in the overmold 264 corresponds to the number holes 260 in the second portion 116. Similarly, the number of bumpers 292 corresponds to the number of apertures 262 in the second portion 116. In further embodiments, there may not be a 1:1 relationship between these components.

Thus, the invention provides, among other things, a battery pack having a housing that incorporates a heat sink or radiator for dissipating heat that builds within the battery pack. Further, the battery pack may include a variety of additional features including water infiltration protection via a latch and terminal cover, which direct water away from a PCB to a bottom of the battery case housing. Further, the invention provides an internal frame for securing a plurality of battery cells and constructed from a single piece. Additionally, the invention provides wedges that also participate in securing the battery cells and allow the use of different size battery cells, as well. The battery pack also includes an overmold that participates in shock-absorption, prevents the battery pack from sliding, and improves the users grip when inserting and removing the battery pack into and from the power tool.

Various features and advantages of the invention are set forth in the following claims.

What is claimed is:
1. A battery pack comprising:
a housing including a plurality of walls, an inner cavity and an interface for receiving a power tool, the interface including electrical terminals operable to interface with the power tool;
battery cells positioned within the inner cavity and electrically coupled to the electrical terminals; and
a heat sink forming at least a portion of one of the plurality of walls of the housing to at least partially define the inner cavity;
wherein the heat sink includes a first surface exposed to the inner cavity and second surface exposed to an external environment of the battery pack,
wherein the first surface comprises a plurality of rounded grooves, each of the rounded grooves curved with an internal radius conforming to a shape of the battery cells,
wherein the second surface comprises a plurality of projections oriented opposite the power tool with respect to the battery cells and extending out from the second surface,
the first surface and the second surface are surfaces of a single metal component for conducting heat from the first surface to the second surface, and
wherein the plurality of projections occupy a first area on the second surface, and the second surface further includes a second area including the first area and a space surrounding the first area and the plurality of projections.

2. The battery pack of claim 1, wherein the heat sink is constructed from a thermally conductive material and at least one other of the plurality of walls is constructed from a second material that has a thermal conductivity that is less than the thermally conductive material.

3. The battery pack of claim 1, wherein at least a portion of the heat sink extends through an aperture in the at least one wall of the housing to establish a thermal path of continuous conductive material from the inner cavity to the external environment.

4. The battery pack of claim 1, further comprising an electrically isolating layer between the battery cells and the heat sink.

5. The battery pack of claim 1, further comprising an internal frame positioned within the cavity and configured to secure the battery cells relative to the housing.

6. The battery pack of claim 1, further comprising a printed circuit board positioned within the cavity.

7. A battery pack comprising:
a housing including an interface for receiving a power tool, a base portion of the housing, and a plurality of walls that couple the interface to the base portion, wherein the interface, base portion, and the plurality of walls define an inner cavity, the interface including electrical terminals operable to interface with the power tool;
battery cells positioned within the inner cavity and electrically coupled to the electrical terminals; and
a heat sink forming at least a portion of the housing;
wherein the heat sink includes a first surface that is opposite a second surface, the first surface in thermal communication with the battery cells, and a second surface including a plurality of heat transfer elements exposed to an external environment of the battery pack,
wherein the first surface comprises a plurality of rounded grooves, each of the rounded grooves curved with an internal radius to conform to a shape of the battery cells,
wherein the plurality of heat transfer elements comprises a plurality of projections oriented opposite to the plurality of rounded grooves with respect to a center of the heat sink,
the first surface and the second surface are opposite surfaces of a single metal component for conducting heat from the first surface to the second surface, and
wherein the plurality of projections occupy a first area on the second surface, and the second surface further includes a second area including the first area and a space surrounding the first area and the plurality of projections.

8. The battery pack of claim 7, wherein the heat sink is constructed from a metal material.

9. The battery pack of claim 7, further comprising an electrically isolating layer between the battery cells and the first surface of the heat sink.

10. The battery pack of claim 7, wherein the plurality of projections include a channel defined between adjacent projections.

11. The battery pack of claim 7, wherein the heat sink forms the base portion.

12. The battery pack of claim 11, further comprising an overmold covering the base portion, the overmold including an aperture, the heat transfer elements at least partially extending through the aperture.

13. The battery pack of claim 7, further comprising an internal frame positioned within the cavity and configured to secure the battery cells relative to the housing.

14. A battery pack comprising:
a housing including a plurality of walls, an inner cavity, and an interface for receiving a power tool, the interface including electrical terminals operable to interface with the power tool;
battery cells positioned within the inner cavity and electrically coupled to the electrical terminals; and
a metal heat sink fixed in one of the plurality of walls, wherein the metal heat sink is configured to dissipate heat generated in the inner cavity to an external environment of the battery pack,
wherein the heat sink comprises a first surface comprising a first plurality of rounded grooves, each of the rounded grooves curved with an internal radius to conform to a shape of the battery cells,
wherein the second surface comprises a plurality of projections oriented opposite the power tool with respect to the battery cells,
the first surface and the second surface are surfaces of a single metal component for conducting heat from the first surface to the second surface, and
wherein the plurality of projections occupy a first area on the second surface, and the second surface further includes a second area including the first area and a space surrounding the first area and the plurality of projections.

15. The battery pack of claim 14, further comprising an overmold covering at least a portion of the housing, the overmold including an aperture, and the projections at least partially extending through the aperture.

16. The battery pack of claim 1, wherein the plurality of projections of the second surface is greater in number than the plurality of rounded grooves of the first surface.

17. The battery pack of claim 3, further comprising an overmold covering the base portion, the overmold including an opening aligned with the aperture of the housing, wherein the heat transfer elements at least partially extend through both the aperture and the opening of the overmold.

18. The battery pack of claim 1, wherein the space is provided on the second surface of the heat sink between a side edge of the heat sink and longitudinal ends of the plurality of projections.

19. The battery pack of claim 3, wherein the aperture has a perimeter larger than a perimeter of the first area and smaller than a perimeter of the second area.

* * * * *